United States Patent
Schmid et al.

(10) Patent No.: US 12,510,686 B2
(45) Date of Patent: Dec. 30, 2025

(54) TIME-GATED ENERGY SPECTRA FOR REMOVAL OF BOREHOLE CAPTURE BACKGROUND

(71) Applicant: Halliburton Energy Services, Inc., Houston, TX (US)

(72) Inventors: Gregory Joseph Schmid, Houston, TX (US); Jiaxin Wang, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 167 days.

(21) Appl. No.: 18/412,008

(22) Filed: Jan. 12, 2024

(65) Prior Publication Data
US 2025/0231317 A1    Jul. 17, 2025

(51) Int. Cl.
G01V 5/10 (2006.01)

(52) U.S. Cl.
CPC ................... G01V 5/108 (2013.01)

(58) Field of Classification Search
CPC ...................................... G01V 5/108
See application file for complete search history.

(56) References Cited

U.S. PATENT DOCUMENTS

| | | | |
|---|---|---|---|
| 7,408,150 B1 * | 8/2008 | Flaum | G01V 5/125 250/269.6 |
| 9,910,185 B2 | 3/2018 | Luo et al. | |
| 9,964,665 B2 | 5/2018 | Galford et al. | |
| 10,042,082 B2 | 8/2018 | Luo et al. | |
| 10,061,054 B2 | 8/2018 | Jacobson et al. | |
| 10,067,261 B2 | 9/2018 | Hu et al. | |
| 10,182,491 B2 | 1/2019 | Navarro Sorroche et al. | |
| 10,209,395 B2 | 2/2019 | Hu et al. | |
| 10,274,638 B2 | 4/2019 | Navarro Sorroche et al. | |
| 10,288,763 B2 | 5/2019 | Navarro Sorroche et al. | |
| 10,386,537 B2 | 8/2019 | Galford et al. | |
| 10,502,861 B2 | 12/2019 | Navarro Sorroche et al. | |
| 10,634,811 B2 | 4/2020 | Navarro Sorroche et al. | |
| 10,677,040 B2 | 6/2020 | Hu et al. | |

(Continued)

OTHER PUBLICATIONS

International Search Report and Written Opinion for International Patent Application No. PCT/US2024/013514 dated Oct. 8, 2024. PDF file. 6 pages.

*Primary Examiner* — David P Porta
*Assistant Examiner* — Fani Polyzos Boosalis
(74) *Attorney, Agent, or Firm* — Benjamin Ford; C. Tumey Law Group, PLLC

(57) ABSTRACT

A method and systems for taking downhole measurements. The method may include selecting a pulsing scheme for taking one or more measurements using a pulsed neutron logging tool, selecting a neutron burst width for the pulsing scheme based at least in part on a neutron tube utilized by the pulsed neutron logging tool to form at least in part a neutron burst train, and selecting a decay window in which the one or more measurements are performed by the pulsed neutron logging tool. The method may further include selecting a starting time for a late gate in which the one or measurements are taken, disposing the pulsed neutron logging tool into a borehole, performing the neutron burst train with the pulsed neutron logging tool, and performing the one or more measurements with the pulsed neutron logging tool during the late gate.

20 Claims, 12 Drawing Sheets

(56) References Cited

U.S. PATENT DOCUMENTS

| | | |
|---|---|---|
| 10,895,661 B2 | 1/2021 | Guo et al. |
| 11,237,294 B2 | 2/2022 | Crawford et al. |
| 11,774,628 B2 | 10/2023 | Wang et al. |
| 2013/0211724 A1 | 8/2013 | Fitzgerald et al. |
| 2018/0329109 A1 | 11/2018 | Navarro Sorroche et al. |
| 2019/0219731 A1 | 7/2019 | Navarro Sorroche et al. |
| 2019/0383962 A1* | 12/2019 | Zhou ................. G01V 5/104 |
| 2021/0208303 A1* | 7/2021 | Jurczyk ............... G01V 5/101 |
| 2021/0341640 A1 | 11/2021 | Guo |

\* cited by examiner

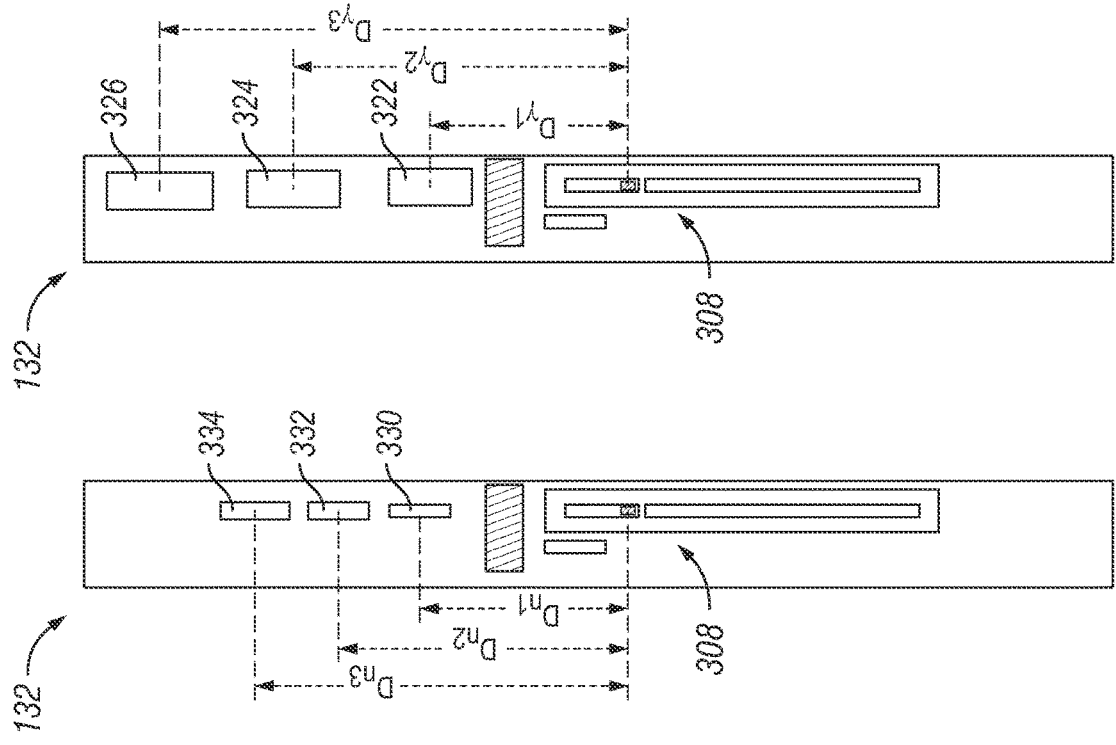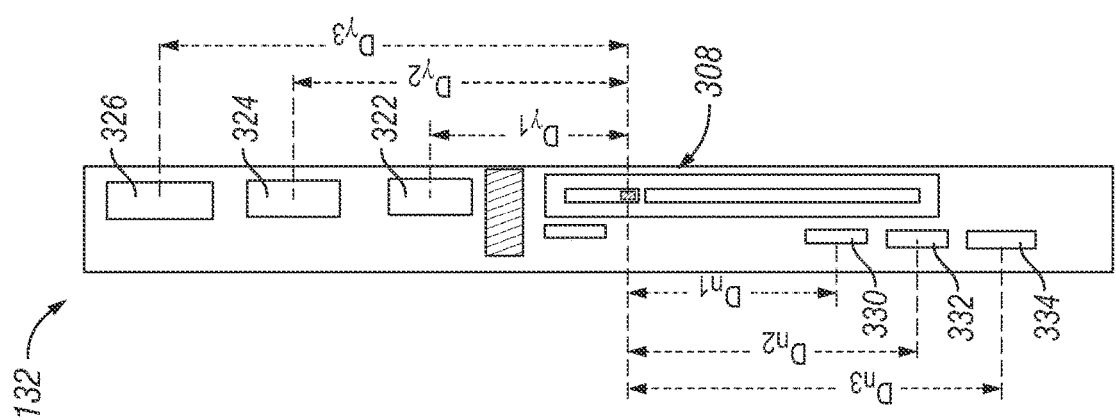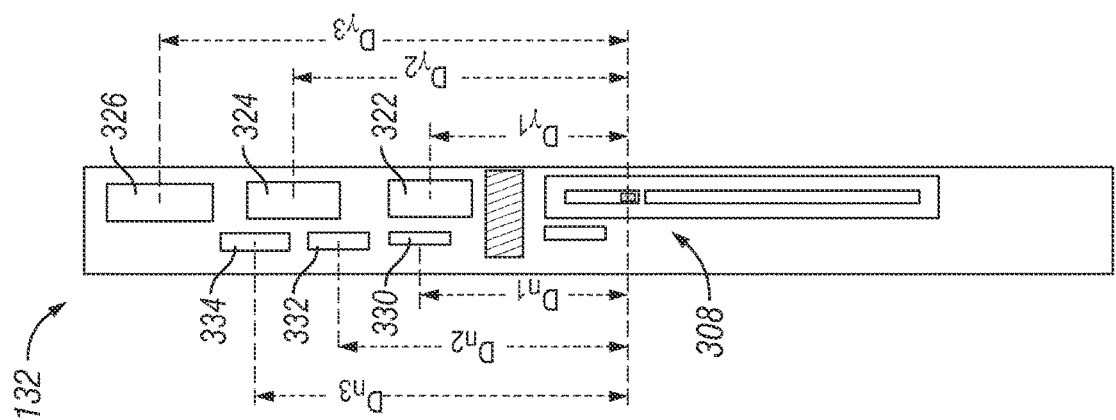

TIME-GATED ENERGY SPECTRA FOR REMOVAL OF BOREHOLE CAPTURE BACKGROUND

BACKGROUND

Wellbores drilled into subterranean formations may enable recovery of desirable fluids (e.g., hydrocarbons) using a number of different techniques. During drilling operations, slickline operations, or during wireline operations, measurements may be taken to determine the presence of oil, water, gas, and/or the like. One such device that may be utilized for these measurements may be a pulsed neutron tool. The pulsed neutron tool may comprise a pulsed neutron generator (PNG) that may operate and function to transmit neutrons into a formation for either logging while drilling (LWD) or wireline logging measurements.

BRIEF DESCRIPTION OF THE DRAWINGS

These drawings illustrate certain aspects of some examples of the present disclosure and should not be used to limit or define the disclosure.

FIG. 4A-4D are diagrams of alternative embodiments of a pulsed neutron logging tool.

DETAILED DESCRIPTION

The present disclosure generally relates to systems and methods for measurement operations utilizing a pulsed neutron logging tool in a logging while drilling (LWD) and/or a wireline operation. As disclosed below, the pulsed neutron logging tool may comprise a pulsed neutron generator rather than a chemical neutron source. A pulsed neutron generator may allow for higher neutron yields, higher energy fast neutrons, and may further allow for computer-based timing for the pulsing and broadcasting of neutrons during a measurement operation. Various pulsing schemes may be configured and utilized to produce sharp and narrow neutron pulses or bursts by a neutron generator to realize different neutron measurements. Measurements may comprise borehole fluidic, and formation capture sigma (Sigma), carbon-oxygen ratio (C/O), fast neutron inelastic and thermal neutron capture spectroscopy, in addition to formation neutron porosity.

Currently, geochemical logging tools employ neutron-induced gamma ray spectroscopy to assess elemental composition. Although it is the formation gamma rays that are of interest, borehole gamma rays may also be present and form a background that complicates analysis. Techniques are needed to reduce this borehole influence on the energy spectra. Removal of undesirable signals created by borehole fluid is discussed in the systems and methods below.

As will be discussed in greater detail below, a neutron generator produces neutrons using a "burst-on, burst-off" sequence. During burst-on, the neutrons enter the formation and produce gamma rays by inelastic and capture reactions. During burst-off, the neutron population and gamma ray intensity decay away by capture. In analyzing the time decay curve, two regimes are apparent. A first regime with an early time that is dominated by borehole capture and a second regime with a late time that is dominated by formation capture. Taking measurements late enough time shows that the borehole signal may have mostly decayed away leaving a relatively clean formation signal. A time-gated energy spectrum in this regime may be largely borehole free. Getting rid of borehole signal contamination is a constant undertaking for creating useable and readable geochemical logs. Identifying methods and systems that may reduce borehole signal contamination may reduce the error of the derived elemental yields and elemental weight concentrations of the formation.

Figure 1:
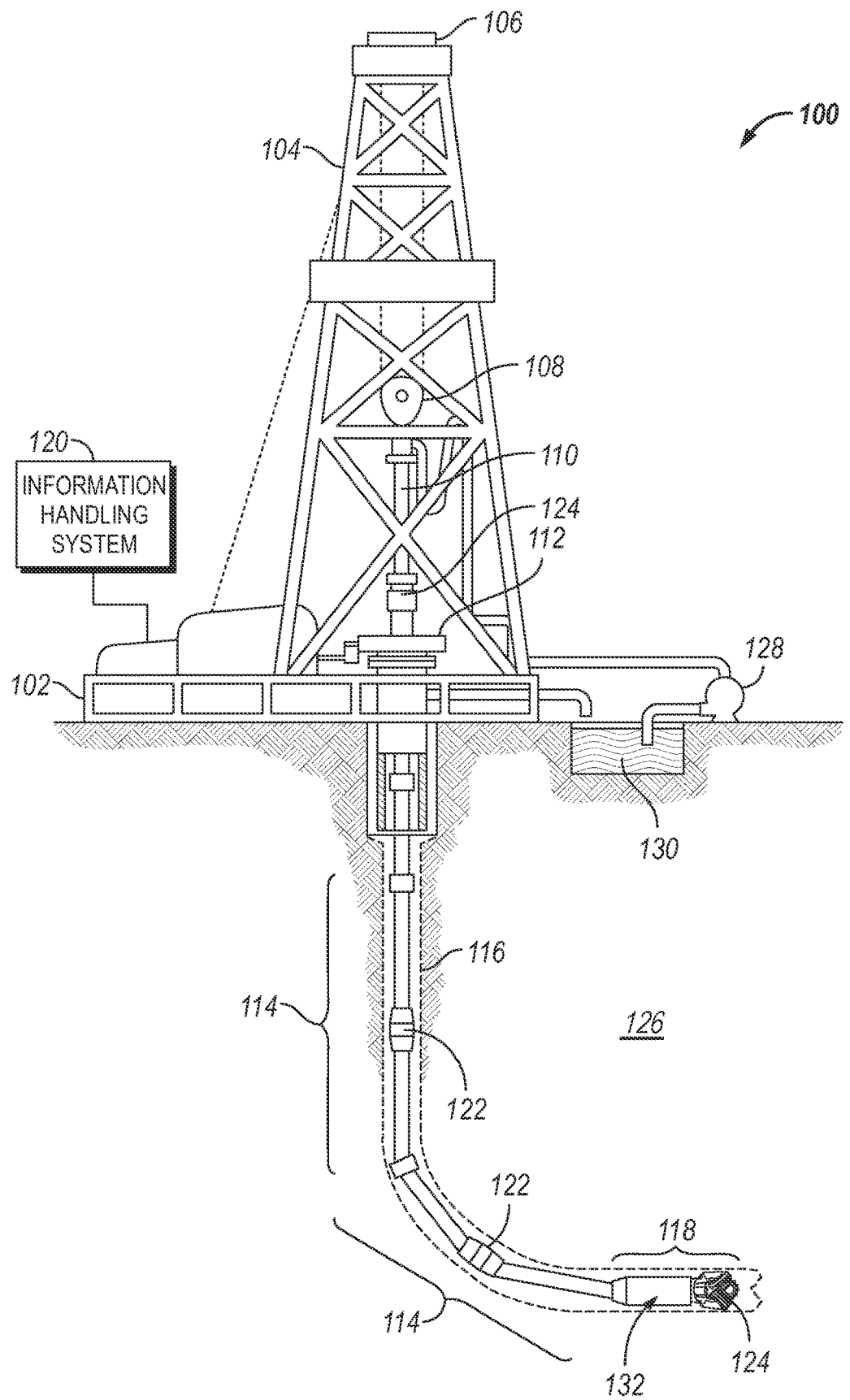
FIG. 1 illustrates a logging while drilling operation utilizing a pulsed neutron logging tool, in accordance with examples of the present disclosure.

FIG. 1 is a diagram of an example drilling environment. Drilling environment 100 may include platform 102 that supports derrick 104 having a traveling block 108 for raising and lowering top drive 110 and drillstring 114. Top drive 110 supports and rotates drillstring 114 as it is lowered through wellhead 112. In turn, drill bit 124, located at the end of drillstring 114, may create borehole 116. Borehole 116 may be formed through the Earth surface into a subterranean formation 126 in the Earth crust. Bottom-hole assembly 118 may include a pulsed neutron logging tool 132 (e.g., having a scintillator that is $CeBr_3$) for logging while drilling operations. Each of these components is described below. Pulsed neutron logging tool 132 may be a dual-purpose (dual application) gamma-ray spectroscopy logging tool in contemporaneously (e.g., simultaneously) detecting (facilitating measuring) both (1) neutron-induced gamma rays from the subterranean formation 126 and (2) natural gamma rays from the subterranean formation 126. In implementations for logging while drilling, such dual application can reduce complexity of bottom-hole assembly 118 and save rig time in facilitating spectroscopic measurements of both neutron-induced gamma rays and natural gamma rays in a single run (in the same run) into borehole 116.

Platform 102 is a structure which may be used to support one or more other components of drilling environment 100 (e.g., derrick 104). Platform 102 may be designed and constructed from suitable materials (e.g., concrete) which are able to withstand the forces applied by other components (e.g., the weight and counterforces experienced by derrick 104). In any embodiment, platform 102 may be constructed to provide a uniform surface for drilling operations in drilling environment 100.

Derrick 104 is a structure which may support, contain, and/or otherwise facilitate the operation of one or more pieces of the drilling equipment. In any embodiment, derrick 104 may provide support for crown block 106, traveling block 108, and/or any part connected to (and including) drillstring 114. Derrick 104 may be constructed from any suitable materials (e.g., steel) to provide the strength necessary to support those components.

Crown block 106 is one or more simple machine(s) which may be rigidly affixed to derrick 104 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 104 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring 114 (e.g., via top drive 110) and allow for drillstring 114 (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses non-parallel tension). Traveling block 108 may move vertically (e.g., up, down) within derrick 104 via the extension and retraction of the drilling line.

Top drive 110 is a machine which may be configured to rotate drillstring 114. Top drive 110 may be affixed to traveling block 108 and configured to move vertically within derrick 104 (e.g., along with traveling block 108). In any embodiment, the rotation of drillstring 114 (caused by top drive 110) may allow for drillstring 114 to carve borehole 116. Top drive 110 may use one or more motor(s) and gearing mechanism(s) to cause rotations of drillstring 114. In any embodiment, a rotatory table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Drillstring 114 is a machine which may be used to carve borehole 116 and/or gather data from borehole 116 and the surrounding geology. Drillstring 114 may include one or more drillpipe(s), one or more repeater(s) 122, and bottom-hole assembly 118. Drillstring 114 may rotate (e.g., via top drive 110) to form and deepen borehole 116 (e.g., via drill bit 124) and/or via one or more motor(s) attached to drillstring 114.

Borehole 116 is a hole in the ground which may be formed by drillstring 114 (and one or more components thereof). Borehole 116 may be partially or fully lined with casing to protect the surrounding ground from the contents of borehole 116, and conversely, to protect borehole 116 from the surrounding ground.

Bottom-hole assembly 118 is a machine which may be equipped with one or more tools for creating, providing structure, and maintaining borehole 116, as well as one or more tools for measuring the surrounding environment (e.g., measurement while drilling (MWD), logging while drilling (LWD)). In any embodiment, bottom-hole assembly 118 may be disposed at (or near) the end of drillstring 114 (e.g., in the most "downhole" portion of borehole 116).

Non-limiting examples of tools that may be included in bottom-hole assembly 118 include a drill bit (e.g., drill bit 124), casing tools (e.g., a shifting tool), a plugging tool, a mud motor, a drill collar (thick-walled steel pipes that provide weight and rigidity to aid the drilling process), actuators (and pistons attached thereto), a steering system, and any measurement tool (e.g., sensors, probes, particle generators, etc.).

Further, bottom-hole assembly 118 may include a telemetry sub to maintain a communications link with the surface (e.g., with information handling system 120). Such telemetry communications may be used for (i) transferring tool measurement data from bottom-hole assembly 118 to surface receivers, and/or (ii) receiving commands (from the surface) to bottom-hole assembly 118 (e.g., for use of one or more tool(s) in bottom-hole assembly 118). In examples, telemetry communications may be at least in part between bottom-hole assembly 118 and information handling system 120.

As illustrated, the information handling system 120 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price.

Information handling system 120 may include a processing unit (e.g., microprocessor, central processing unit, etc.) that may process drilling data from rotary steerable system (RSS) 242, discussed below, by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 120 may also include input device(s) (e.g., keyboard, mouse, touchpad, etc.) and output device(s) (e.g., monitor, printer, etc.). The input device(s) and output device(s) provide a user interface that enables an operator to interact with any device disposed or apart of bottom-hole assembly 118, discussed below, and/or software executed by a processing unit. For example, information handling system 120 may enable an operator to select analysis options, view collected log data, view analysis results, and/or perform other tasks.

Non-limiting examples of techniques for transferring tool measurement data (to the surface) include mud pulse telemetry and through-wall acoustic signaling. For through-wall acoustic signaling, one or more repeater(s) 122 may detect, amplify, and re-transmit signals from bottom-hole assembly 118 to the surface (e.g., to information handling system 120), and conversely, from the surface (e.g., from information handling system 120) to bottom-hole assembly 118.

Repeater 122 is a device which may be used to receive and send signals from one component of drilling environment 100 to another component of drilling environment 100. As a non-limiting example, repeater 122 may be used to receive a signal from a tool on bottom-hole assembly 118 and send that signal to information handling system 120. Two or more repeaters 122 may be used together, in series, such that a signal to/from bottom-hole assembly 118 may be relayed through two or more repeaters 122 before reaching its destination.

A transducer is a device that may work with repeater 122 to transfer information from the surface to bottom-hole assembly 118. A transducer may be configured to convert non-digital data (e.g., vibrations, other analog data) into a digital form suitable for information handling system 120. As a non-limiting example, the one or more transducer(s) may convert signals between mechanical and electrical forms, enabling information handling system 120 to receive the signals from a telemetry sub, on bottom-hole assembly 118, and conversely, transmit a downlink signal to the telemetry sub on bottom-hole assembly 118. In any embodiment, the transducer may be located at the surface and/or any part of drillstring 114 (e.g., as part of bottom-hole assembly 118).

Drill bit 124 is a machine which may be used to cut through, scrape, and/or crush (i.e., break apart) materials in the ground (e.g., rocks, dirt, clay, etc.). Drill bit 124 may be disposed at the frontmost point of drillstring 114 and bottom-hole assembly 118. In any embodiment, drill bit 124 may include one or more cutting edges (e.g., hardened metal points, surfaces, blades, protrusions, etc.) to form a geometry which aids in breaking ground materials loose and further crushing that material into smaller sizes. In any embodiment, drill bit 124 may be rotated and forced into (i.e., pushed against) the ground material to cause the cutting, scraping, and crushing action. The rotations of drill bit 124 may be caused by top drive 110 and/or one or more motor(s) located on drillstring 114 (e.g., on bottom-hole assembly 118).

Pump 128 is a machine that may be used to circulate drilling fluid 130 from a reservoir, through a feed pipe, to derrick 104, to the interior of drillstring 114, out through drill bit 124 (through orifices, not shown), back upward through borehole 116 (around drillstring 114), and back into the reservoir. In any embodiment, any appropriate pump 128 may be used (e.g., centrifugal, gear, etc.) which is powered by any suitable means (e.g., electricity, combustible fuel, etc.).

Drilling fluid 130 is a liquid which may be pumped through drillstring 114 and borehole 116 to collect drill cuttings, debris, and/or other ground material from the end of borehole 116 (e.g., the volume most recently hollowed by drill bit 124). Further, drilling fluid 130 may provide conductive cooling to drill bit 124 (and/or bottom-hole assembly 118). In any embodiment, drilling fluid 130 may be circulated via pump 128 and filtered to remove unwanted debris.

During drilling operations, bottom-hole assembly may comprise, at least in part, a pulsed neutron logging tool 132. This may allow for logging while drilling operations to be performed. Measurements taken by pulsed neutron logging tool 132 may be gathered and/or processed by information handling system 120. For example, measurements taken by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on and/or near pulsed neutron logging tool 132 or may occur both downhole and at surface. Information handling system 120 may process the signals, and the information contained therein may be displayed for an operator to observe and stored for future processing and reference. Information handling system 120 may also contain an apparatus for supplying control signals and power to pulsed neutron logging tool 132. Although illustrated as disposed on bottom-hole assembly 118 in a drilling operation, pulsed neutron logging tool 132 may also be disposed in borehole 116 in a wireline operation. Moreover, as mentioned, pulsed neutron logging tool 132 can have a scintillator detector having a scintillator (scintillation crystal) that is or includes $CeBr_3$.

Figure 2:
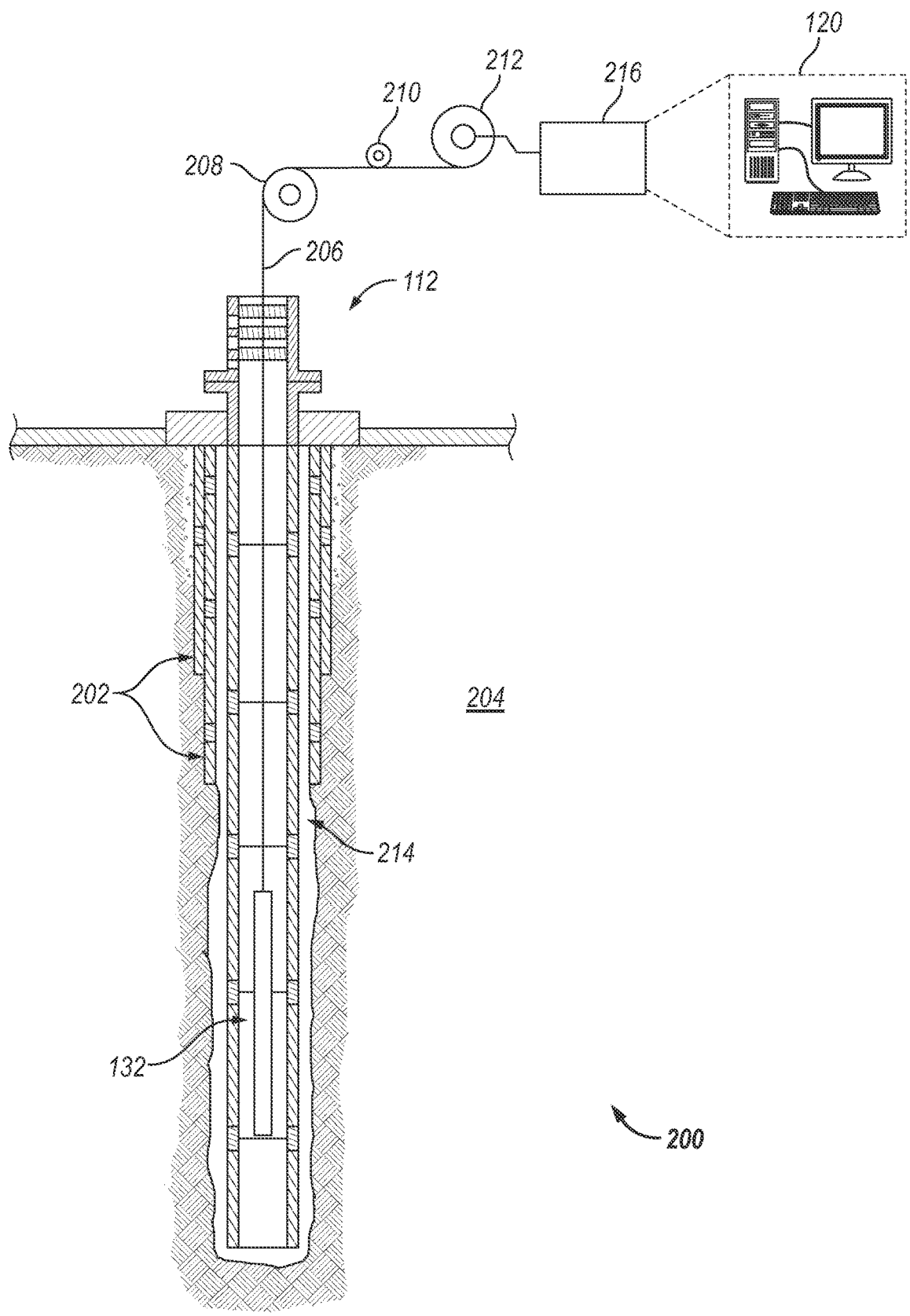
FIG. 2 illustrates the pulsed neutron logging tool in a wireline operation, in accordance with examples of the present disclosure.

FIG. 2 illustrates a wireline operation 200, as disclosed herein, utilizing a pulsed neutron logging tool 132. Pulsed neutron logging tool 132 can have a scintillator detector in which the scintillator may be or include $CeBr_3$. FIG. 2 illustrates a cross-section of borehole 116 with a pulsed neutron logging tool 132 traveling through casing string 202. Borehole 116 may traverse through subterranean formation 204 as a vertical well and/or a horizontal well. Pulsed neutron logging tool 132 may be suspended by a conveyance 206, which communicates power from a logging center 216 to pulsed neutron logging tool 132 and communicates telemetry from pulsed neutron logging tool 132 to information handling system 120. In examples, pulsed neutron logging tool 132 may be operatively coupled to a conveyance 206 (e.g., wireline, slickline, coiled tubing, pipe, downhole tractor, and/or the like) which may provide mechanical suspension, as well as electrical connectivity, for pulsed neutron logging tool 132. Conveyance 206 and pulsed neutron logging tool 132 may extend within casing string 202 to a depth within borehole 116. Conveyance 206, which may include one or more electrical conductors, may exit wellhead 112, may pass around pulley 208, may engage odometer 210, and may be reeled onto winch 212, which may be employed to raise and lower the tool assembly in borehole 116. Wellhead 112 may allow for entry into borehole 116 and placement of pulsed neutron logging tool 132 into pipe string 214. The position of pulsed neutron logging tool 132 may be monitored in a number of ways, including an inertial tracker in pulsed neutron logging tool 132 and a paid-out conveyance length monitor in logging facility 216.

Multiple such measurements may be desirable to enable the system to compensate for varying cable tension and cable stretch due to other factors. Information handling system 120 in logging facility 216 collects telemetry and position measurements and provides position-dependent logs of measurements from pulsed neutron logging tool 132 and values that may be derived therefrom.

Pulsed neutron logging tool 132 generally includes multiple instruments for measuring a variety of downhole parameters. Wheels, bow springs, fins, pads, or other centralizing mechanisms may be employed to keep pulsed neutron logging tool 132 near the borehole axis during measurement operations. During measurement operations, generally, measurements may be performed as pulsed neutron logging tool 132 is drawn up hole at a constant rate. The parameters and instruments may vary depending on the needs of the measurement operation.

Measurements taken by pulsed neutron logging tool 132 may be gathered and/or processed by information handling system 120. For example, signals recorded by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on pulsed neutron logging tool 132 or may occur both downhole and at surface. In some examples, signals recorded by pulsed neutron logging tool 132 may be conducted to information handling system 120 by way of conveyance 206. Information handling system 120 may process the signals, and the information contained therein may be displayed for an operator to observe and stored for future processing and reference. Information handling system 120 may also contain an apparatus for supplying control signals and power to pulsed neutron logging tool 132.

In wireline operations 200, a digital telemetry system may be employed, wherein an electrical circuit may be used to both supply power to pulsed neutron logging tool 132 and to transfer data between information handling system 120 and pulsed neutron logging tool 132. A DC voltage may be provided to pulsed neutron logging tool 132 by a power supply located above ground level, and data may be coupled to the DC power conductor by a baseband current pulse system. Alternatively, pulsed neutron logging tool 132 may be powered by batteries located within the downhole tool assembly, and/or the data provided by pulsed neutron logging tool 132 may be stored within the downhole tool assembly, rather than transmitted to the surface during logging.

Figure 3:
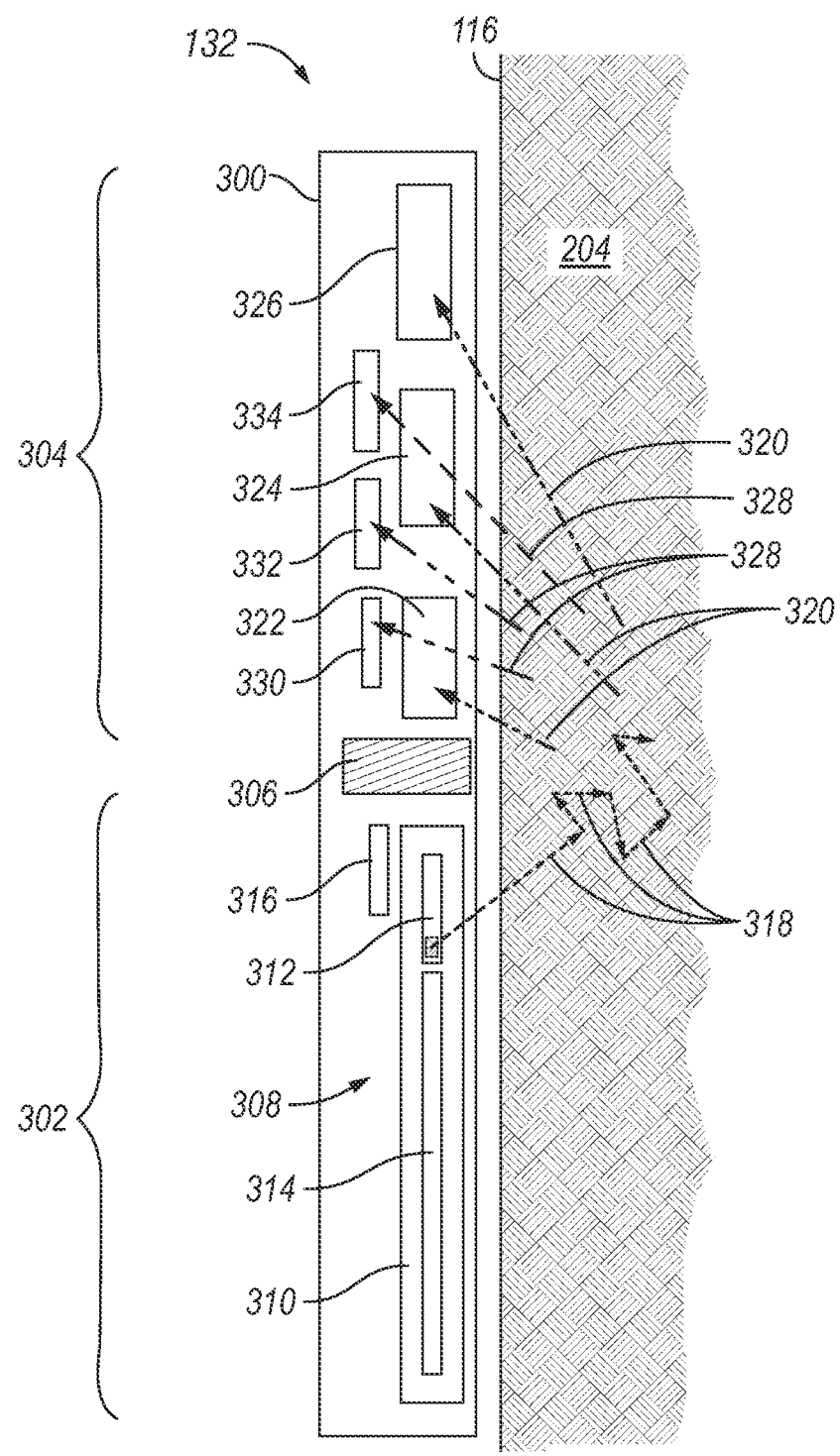
FIG. 3 is a diagram of illustrative embodiments of a pulsed neutron logging tool.

FIG. 3 illustrates pulsed neutron logging tool 132 disposed in borehole 116. It should be noted, as discussed above, that pulsed neutron logging tool 132 may be disposed on a bottom-hole assembly 118 (e.g., referring to FIG. 1) in a logging while drilling operation or utilized in a wireline operation (e.g., referring to FIG. 2). Additionally, the orientation of pulsed neutron logging tool 132, whether the generator is disposed above or below the detectors, is inconsequential.

With continued reference to FIG. 3, pulsed neutron logging tool 132 may comprise an outer housing 300 which may be formed from a heavy metal such as steel, Inconel, etc. Housing 300 may protect the internal devices of pulsed neutron logging tool 132 from the downhole environment that pulsed neutron logging tool 132 may experience in borehole 116. As illustrated, pulsed neutron logging tool 132 may be divided into a generation area 302 and a detection area 304 that are separated by shielding 306. From generation area 302, neutrons may be generated and broadcast into formation 204 (referring to FIG. 2). Detection area 304 may be operated and function to detect gamma rays that may originate from formation 204 naturally or induced by the broadcast of neutrons into formation 204.

Generation area 302 may comprise a pulsed neutron generator 308 that may be packaged within $SF_6$ housing 310. $SF_6$ housing 310 may be comprised of a heavy metal like stainless steel, etc. As noted above, within $SF_6$ housing 310 may be a pulsed neutron generator 308 that may further comprise a neutron tube 312, which generates neutrons for broadcasting, and a high voltage (HV) ladder power supply 314 that may be utilized to power neutron tube 312. In other examples, pulsed neutron generator 308 may be replaced with a continuous neutron source such as Americium-Beryllium (Am—Be) chemical source. Outside of $SF_6$ housing 310 may be a fast neutron monitor 316, that may be utilized to monitor the broadcasting of neutrons 318 from generation area 302 into formation 204. For example, during operations pulsed neutron logging tool 132 may generate pulses of high energy neutrons that radiate from pulsed neutron generator 308 into the surrounding environment including borehole 116 and formation 204. The highly energetic neutrons 318 entering the surrounding environment interact with atomic nuclei, inducing gamma ray radiation. Induced inelastic and capture gamma rays 320 and thermal neutrons 328 may be sensed and recorded by detection area 304. The scattered neutrons and gamma ray spectrum may be measured to determine properties of borehole 116 and formation 204. Through processing, the measurements may be utilized to identify oil and gas in formation 204 as well as determining the flow in production wells. As illustrated, neutrons 318 may be broadcasted into formation 204, wherein neutrons 318 may interact with material within formation 204 to create inelastic and capture gamma rays 320, discussed in greater detail below. Inelastic and capture gamma rays 320 may be detected, sensed, and/or measured by devices within detection area 304 of pulsed neutron logging tool 132.

Detection area 304 may comprise a number of devices that may be utilized to detect, sense, and/or measure inelastic and capture gamma rays 320. As illustrated, a number of gamma ray scintillator detectors may be utilized, which implement a scintillation crystal coupled to a photomultiplier tube. In examples, gamma ray scintillator detectors may be identified as a near gamma ray scintillator detector 322, a far gamma ray scintillator detector 324, and a long gamma ray scintillator detector 326. Identification of each scintillator detector as near, far, and long is due to the distance from neutron generator 308. For example, the closest scintillator detector to neutron generator 308 is "near," the second closest is "far", and the third closest is "long." This nomenclature may also be utilized for thermal neutron detectors that may also be disposed within detection area 304 and may operate and function to detect thermal neutrons 328 that may originate from formation 204 during the interaction of neutrons 318 with material within formation 204. For example, neutron detectors may operate and function to count thermal (around about 0.025 eV) and/or epithermal (between about 0.1 eV and 100 eV) neutrons. Suitable neutron detectors include Helium-3 (He-3) filled proportional counters, though other neutron counters may also be used. Thus, within detection area 304 may be a near thermal neutron detector 330, a far thermal neutron detector 332, and a long thermal neutron detector 334. As noted above, detection area 304 may be separated from generation area 302 by shielding 306.

Shielding 306 may be a structure formed of a heavy metal like tungsten. This material may operate and function to prevent neutrons 318 that may be generated from pulsed neutron generator 308 from being detected by the detectors in detection area 304. Without shielding 306, neutrons 318 generated from pulsed neutron generator 308 may saturate all detectors within detection area 304 and prevent the detection and measurement of gamma rays and neutrons from formation 204.

FIGS. 4A-4D illustrate different embodiments of pulsed neutron logging tool 132. FIG. 4A illustrates an embodiment shown in FIG. 3. In this embodiment, the distance from pulsed neutron generator 308 to near thermal neutron detector 330 is $D_{n1}$, to far thermal neutron detector 332 is $D_{n2}$, and to long thermal neutron detector 334 is $D_{n3}$. Further, the distance from pulsed neutron generator 308 to near gamma ray scintillator detector 322 is $D_{\gamma 1}$, a far gamma ray scintillator detector 324 is $D_{\gamma 2}$, and a long gamma ray scintillator detector 326 is $D_{\gamma 3}$. FIG. 4B illustrates another embodiment in which the distances $D_{n1}$, $D_{n2}$, $D_{n3}$ from pulsed neutron generator 308 to each thermal neutron detector 330, 332, 334 have changed as each thermal neutron detector is now disposed within generation area 302. FIG. 4C illustrates an embodiment where only thermal neutron detectors 330, 332, 334 with distances $D_{n1}$, $D_{n2}$, $D_{n3}$ are utilized and FIG. 4D illustrates an embodiment where only gamma ray scintillator detectors 332, 324, and 326 distances $D_{\gamma 1}$, $D_{\gamma 2}$, $D_{\gamma 3}$ are utilized.

Multiple detectors of pulsed neutron logging tool 132, may enable pulsed neutron logging tool 132 to measure properties of formation 204 and borehole 116 (e.g., referring to FIG. 3) using any of the existing multiple-spacing techniques. In addition, the presence of gamma ray detectors which have proper distances from pulsed neutron generator 308, may enable the measurement of elemental gamma ray spectroscopy.

As discussed above, during measurement operations, neutrons 318 (e.g., referring to FIG. 3) emitted from neutron source or pulsed neutron generator 308 undergo neutron scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. During interactions, the elastic cross section is nearly constant, whereas the inelastic scattering cross section and absorption cross sections are proportional to the reciprocal of the neutron speed. For example, inelastic scatterings appear for fast neutrons in the MeV energy range, whereas absorptions happen when neutrons slowed down in the eV energy range.

Figure 5:
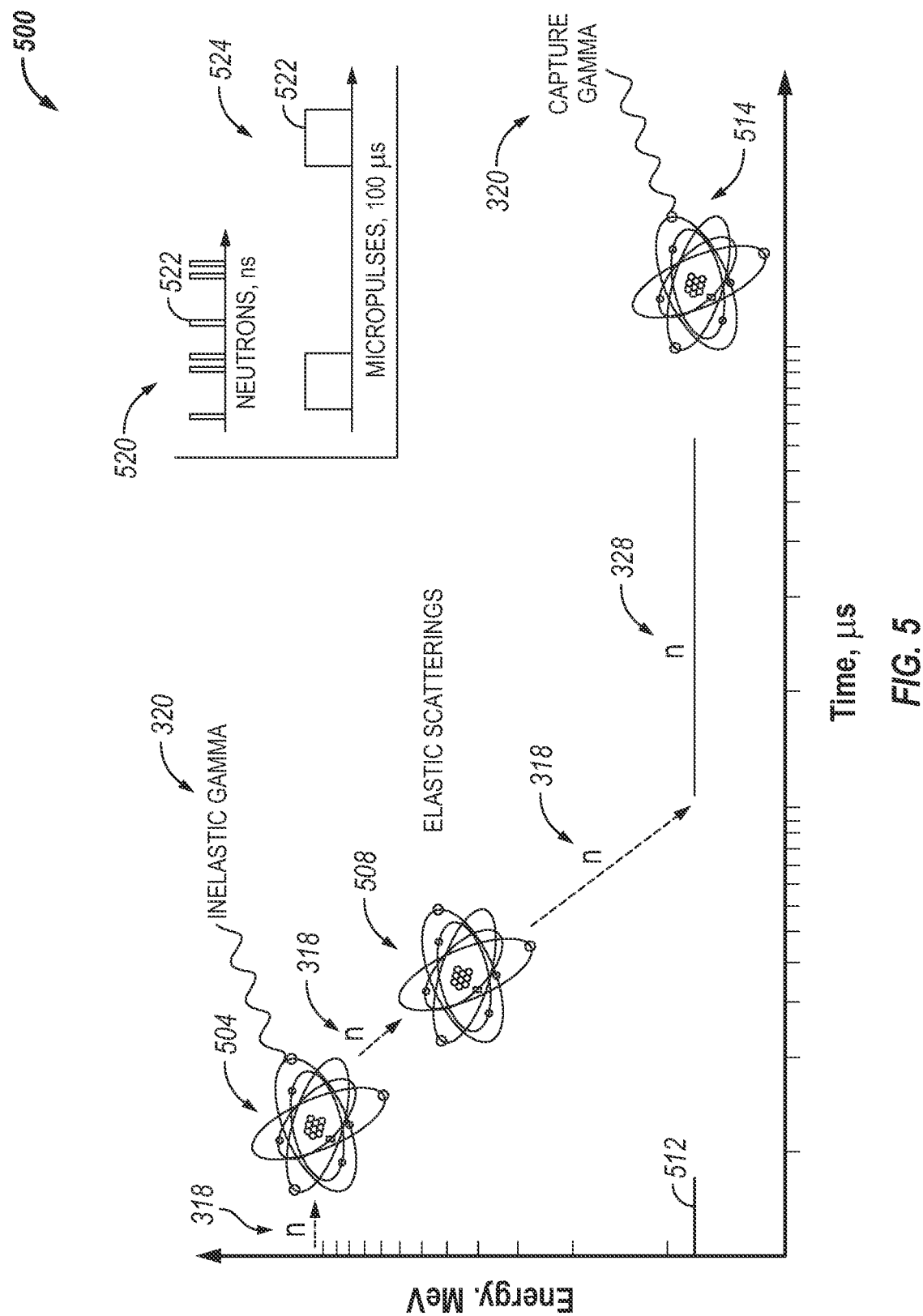
FIG. 5 illustrates the energy of a neutron as it interacts in the present disclosure.

FIG. 5 illustrates a graph 500 that depicts different scattering by a neutron 318. As illustrated, neutron 318 may be traveling at a fast speed with high kinetic energy and interacts with nuclei 504, releasing inelastic gamma ray 320 and lowering the energy state of neutron 318. After the interaction, neutron 318 contains too much energy to be absorbed, thus continuing its path until it interacts with nuclei 508 releasing inelastic gamma ray 320 and again lowering its energy state again. After the interaction, neutron 318 has kinetic energy close to target energy 512, becomes a thermal neutron 328. Thus, when neutron 328 at target energy 512 interacts with nuclei 514 it will be captured. This interaction results in nucleus 514 being rearranged to contain previously traveling neutron 328 and an emitted capture gamma ray 320. Sensing these events with pulsed neutron logging tool 132 using detection area 304 may allow for the identification of oil, gas, and/or water in borehole 116 and formation 204 (e.g., referring to FIG. 3).

With continued reference to FIG. 5, the neutron to gamma ray timing information may be utilized during measurement operations in which a pulsing neutron generator is utilized. In a sub-μs time domain, inelastic gamma rays dominate, whereas in a 10-1000 μs time range, there are only capture gamma rays. Insert 520 on FIG. 5 illustrates an example of neutrons in a neutron pulse 522 and insert 524 shows the relationship of two adjacent neutron pulses 522 with a given pulse width and timing interval. Pulsing schemes allow isolation of inelastic and capture gamma rays 320, and then allow elemental determinations of different nuclei in the bore hole, formation, or fluids.

During measurement operations, pulsed neutron logging tool 132 may take any number of measurements of inelastic and capture gamma rays 320 and/or thermal neutrons 328 (e.g., referring to FIG. 3). These measurements may be further processed by additional methods and systems that may utilize information handling system 120.

Figure 6:
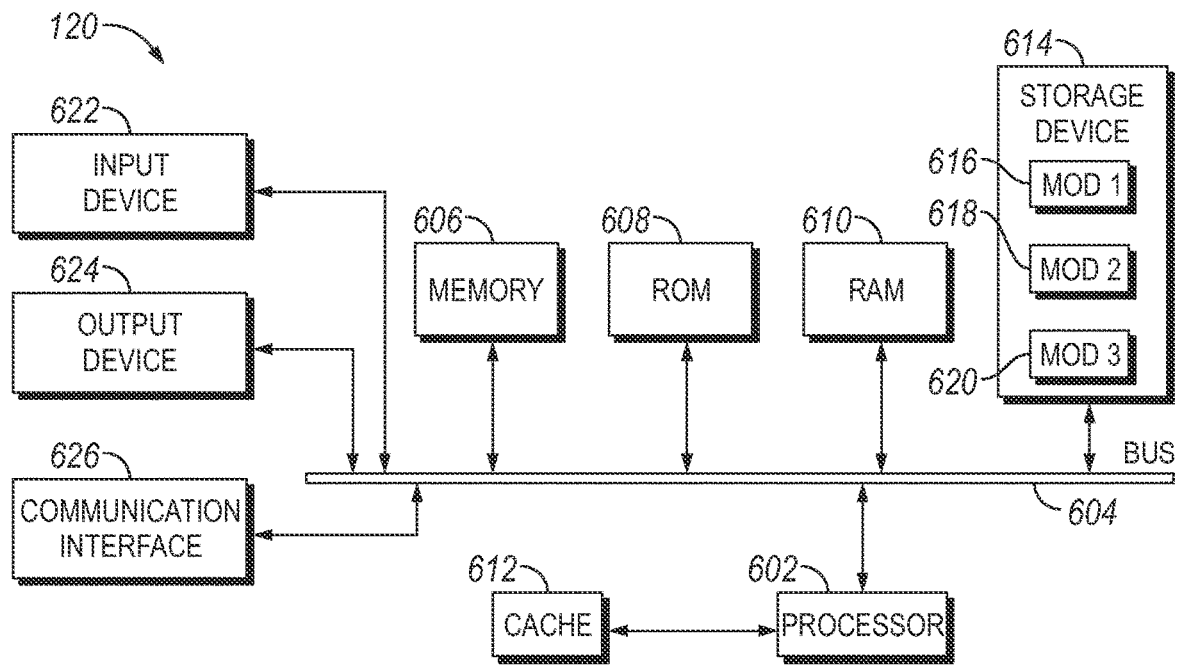
FIG. 6 illustrates a schematic of an information handling system.

FIG. 6 further illustrates an example information handling system 120 which may be employed to perform various steps, methods, and techniques disclosed herein. Persons of ordinary skill in the art will readily appreciate that other system examples are possible. As illustrated, information handling system 120 includes a processing unit (CPU or processor) 602 and a system bus 604 that couples various system components including system memory 606 such as read only memory (ROM) 608 and random-access memory (RAM) 610 to processor 602. Processors disclosed herein may all be forms of this processor 602. Information handling system 120 may include a cache 612 of high-speed memory connected directly with, in close proximity to, or integrated as part of processor 602. Information handling system 120 copies data from memory 606 and/or storage device 614 to cache 612 for quick access by processor 602. In this way, cache 612 provides a performance boost that avoids processor 602 delays while waiting for data. These and other modules may control or be configured to control processor 602 to perform various operations or actions. Other system memory 606 may be available for use as well. Memory 606 may include multiple different types of memory with different performance characteristics. It may be appreciated that the disclosure may operate on information handling system 120 with more than one processor 602 or on a group or cluster of computing devices networked together to provide greater processing capability. Processor 602 may include any general-purpose processor and a hardware module or software module, such as first module 616, second module 618, and third module 620 stored in storage device 614, configured to control processor 602 as well as a special-purpose processor where software instructions are incorporated into processor 602. Processor 602 may be a self-contained computing system, containing multiple cores or processors, a bus, memory controller, cache, etc. A multi-core processor may be symmetric or asymmetric. Processor 602 may include multiple processors, such as a system having multiple, physically separate processors in different sockets, or a system having multiple processor cores on a single physical chip. Similarly, processor 602 may include multiple distributed processors located in multiple separate computing devices but working together such as via a communications network. Multiple processors or processor cores may share resources such as memory 606 or cache 612 or may operate using independent resources. Processor 602 may include one or more state machines, an application specific integrated circuit (ASIC), or a programmable gate array (PGA) including a field PGA (FPGA).

Each individual component discussed above may be coupled to system bus 604, which may connect each and every individual component to each other. System bus 604 may be any of several types of bus structures including a memory bus or memory controller, a peripheral bus, and a local bus using any of a variety of bus architectures. A basic input/output (BIOS) stored in ROM 608 or the like, may provide the basic routine that helps to transfer information between elements within information handling system 120, such as during start-up. Information handling system 120 further includes storage devices 614 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 614 may include software modules 616, 618, and 620 for controlling processor 602. Information handling system 120 may include other hardware or software modules. Storage device 614 is connected to the system bus 604 by a drive interface. The drives and the associated computer-readable storage devices provide nonvolatile storage of computer-readable instructions, data structures, program modules and other data for information handling system 120. In one aspect, a hardware module that performs a particular function includes the software component stored in a tangible computer-readable storage device in connection with hardware components, such as processor 602, system bus 604, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 120 is a small, handheld computing device, a desktop computer, or a computer server. When processor 602 executes instructions to perform "operations", processor 602 may perform the operations directly and/or facilitate, direct, or cooperate with another device or component to perform the operations.

As illustrated, information handling system 120 employs storage device 614, which may be a hard disk or other types of computer-readable storage devices which may store data that are accessible by a computer, such as magnetic cassettes, flash memory cards, digital versatile disks (DVDs), cartridges, random access memories (RAMs) 610, read only memory (ROM) 608, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 120, an input device 622 represents any number of input mechanisms, such as a microphone for speech, a touch-sensitive screen for gesture or graphical input, keyboard, mouse, motion input, speech and so forth. Additionally, input device 622 may receive one or more measurements from bottom-hole assembly 118 (e.g., referring to FIG. 1), discussed above. An output device 624 may also be one or more of a number of output mechanisms known to those of skill in the art. In some instances, multimodal systems enable a user to provide multiple types of input to communicate with information handling system 120. Communications interface 626 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 602, that is purpose-built to operate as an equivalent to software executing on a general-purpose processor. For example, the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 608 for storing software performing the operations described below, and random-access memory (RAM) 610 for storing results. Very large-scale integration (VLSI) hardware embodiments, as well as custom VLSI circuitry in combination with a general-purpose DSP circuit, may also be provided.

Figure 7:
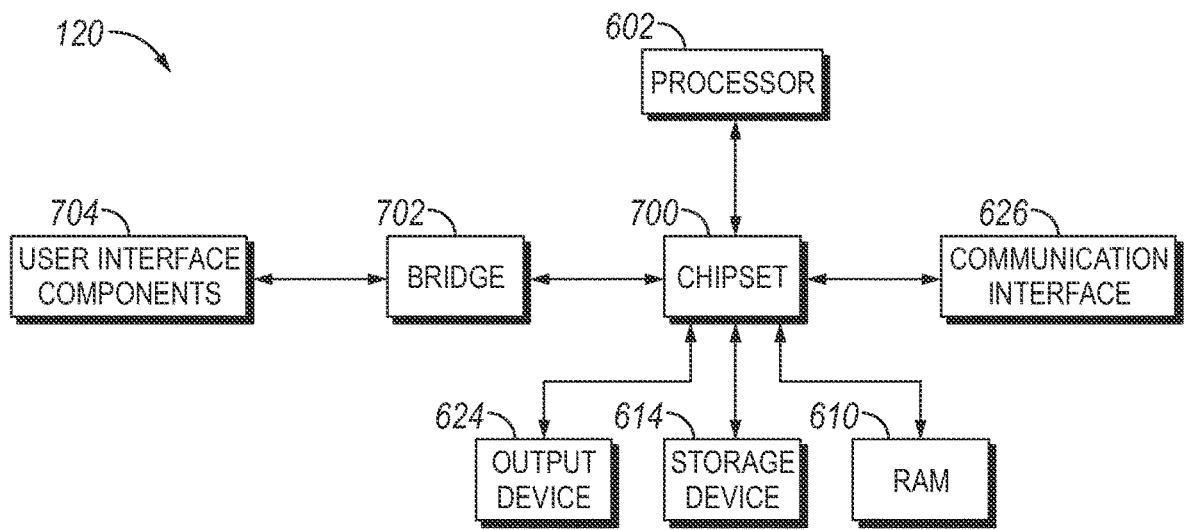
FIG. 7 illustrates a schematic of a chip set.

FIG. 7 illustrates an example information handling system 120 having a chipset architecture that may be used in executing the described method and generating and displaying a graphical user interface (GUI). Information handling system 120 is an example of computer hardware, software, and firmware that may be used to implement the disclosed technology. Information handling system 120 may include a processor 602, representative of any number of physically and/or logically distinct resources capable of executing software, firmware, and hardware configured to perform identified computations. Processor 602 may communicate with a chipset 700 that may control input to and output from processor 602. In this example, chipset 700 outputs information to output device 624, such as a display, and may read and write information to storage device 614, which may include, for example, magnetic media, and solid-state media. Chipset 700 may also read data from and write data to RAM 610. A bridge 702 for interfacing with a variety of user interface components 704 may be provided for interfacing with chipset 700. Such user interface components 704 may include a keyboard, a microphone, touch detection and processing circuitry, a pointing device, such as a mouse, and so on. In general, inputs to information handling system 120 may come from any of a variety of sources, machine generated and/or human generated.

Chipset 700 may also interface with one or more communication interfaces 626 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 602 analyzing data stored in storage device 614 or RAM 610. Further, information handling system 120 receives inputs from a user via user interface components 704 and executes appropriate functions, such as browsing functions by interpreting these inputs using processor 602.

In examples, information handling system 120 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 8:
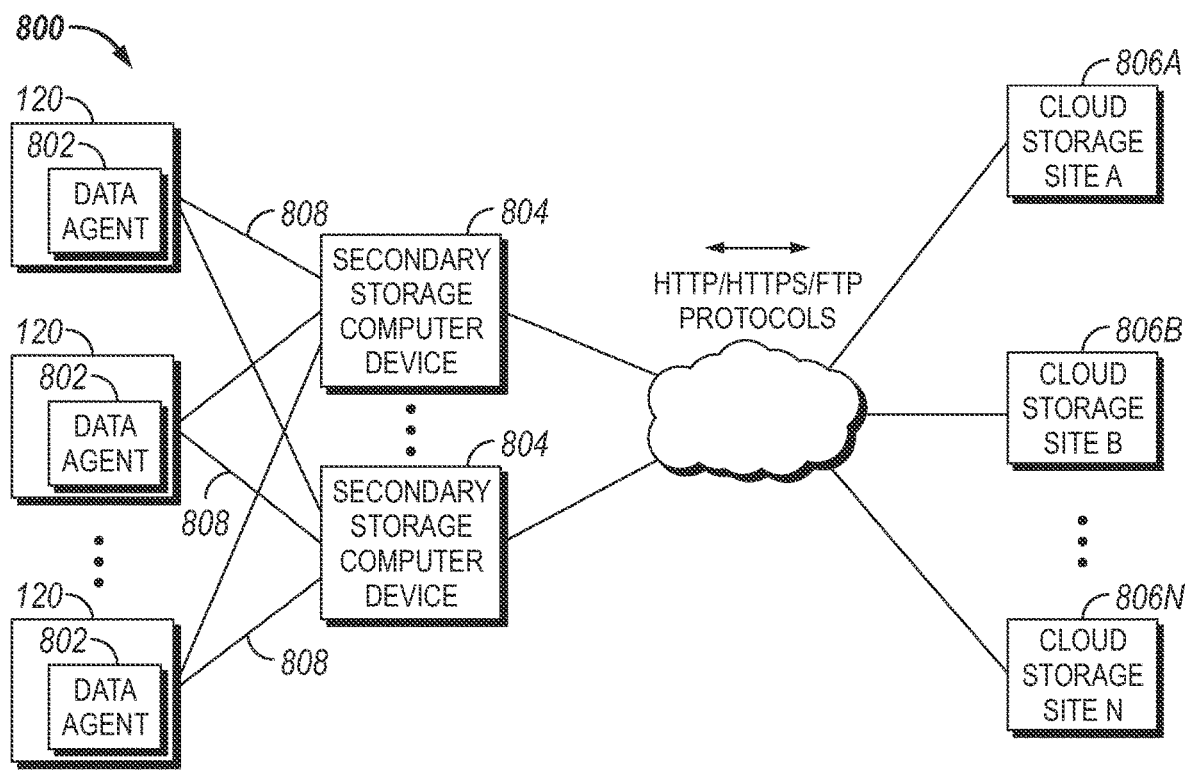
FIG. 8 illustrates a computing network.

FIG. 8 illustrates an example of one arrangement of resources in a computing network 800 that may employ the processes and techniques described herein, although many others are of course possible. As noted above, an information handling system 120, as part of their function, may utilize data, which includes files, directories, metadata (e.g., access control list (ACLS) creation/edit dates associated with the data, etc.), and other data objects. The data on the information handling system 120 is typically a primary copy (e.g., a production copy). During a copy, backup, archive or other storage operation, information handling system 120 may send a copy of some data objects (or some components thereof) to a secondary storage computing device 804 by utilizing one or more data agents 802.

A data agent 802 may be a desktop application, website application, or any software-based application that is run on information handling system 120. As illustrated, information handling system 120 may be disposed at any rig site (e.g., referring to FIG. 1), off site location, or repair and manufacturing center. The data agent may communicate with a secondary storage computing device 804 using communication protocol 808 in a wired or wireless system. Communication protocol 808 may function and operate as an input to a website application. In the website application, field data related to pre- and post-operations, generated DTCs, notes, and the like may be uploaded. Additionally, information handling system 120 may utilize communication protocol 808 to access processed measurements, operations with similar DTCs, troubleshooting findings, historical run data, and/or the like. This information is accessed from secondary storage computing device 804 by data agent 802, which is loaded on information handling system 120.

Secondary storage computing device 804 may operate and function to create secondary copies of primary data objects (or some components thereof) in various cloud storage sites 806A-N. Additionally, secondary storage computing device 804 may run determinative algorithms on data uploaded from one or more information handling systems 120, discussed further below. Communications between the secondary storage computing devices 704 and cloud storage sites 806A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 806A-N, the secondary storage computing device 804 may also perform local content indexing and/or local object-level, sub-object-level or block-level deduplication when performing storage operations involving various cloud storage sites 806A-N. Cloud storage sites 806A-N may further record and maintain, EM logs, map DTC codes, store repair and maintenance data, store operational data, and/or provide outputs from determinative algorithms that are located in cloud storage sites 806A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 9:
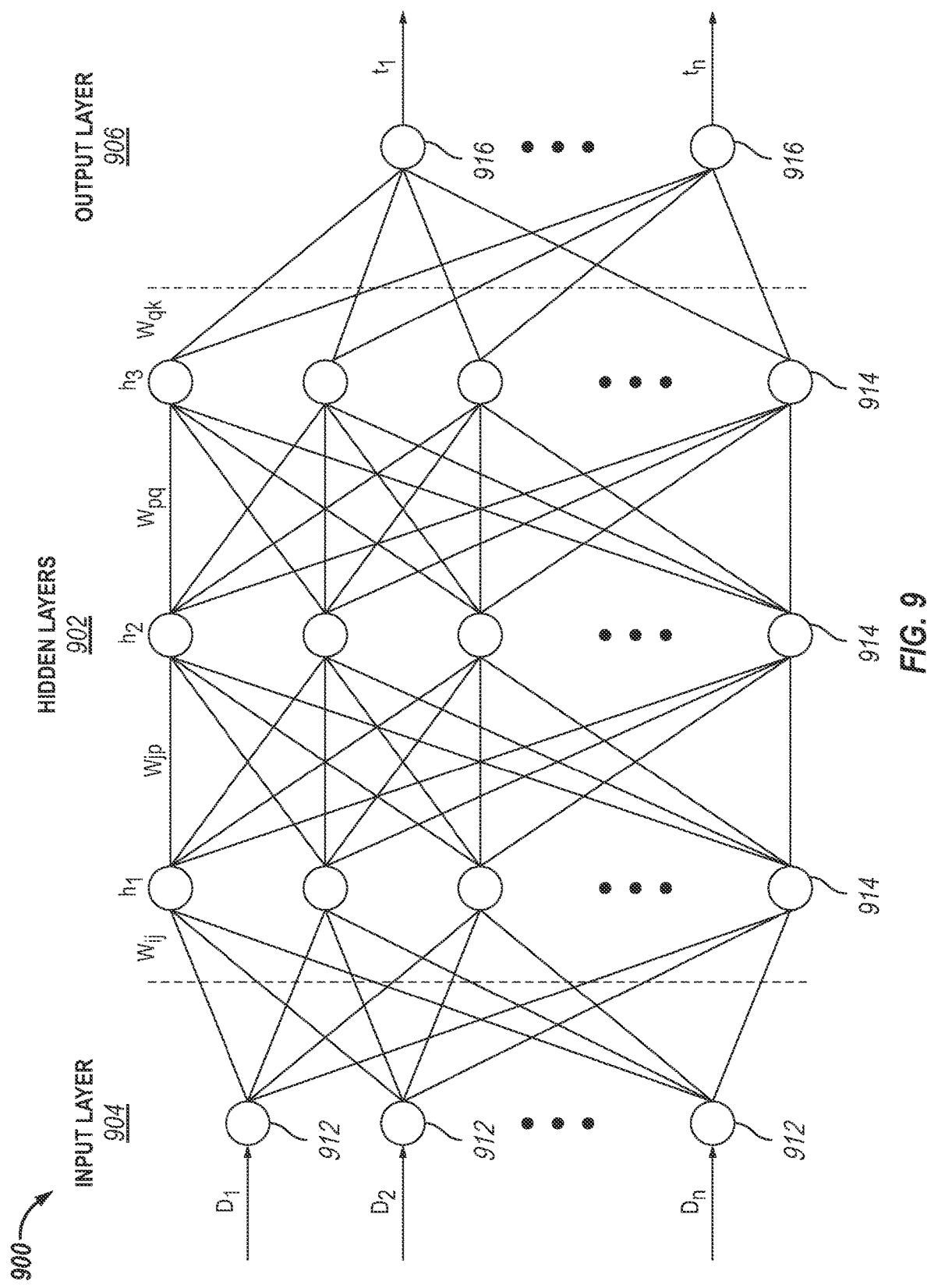
FIG. 9 illustrates a neural network.

In examples to determine a relationship using machine learning, a neural network (NN) 900, as illustrated in FIG. 9, may be utilized to model a three-dimensional finite element BHA to analyze lateral deflection experienced by BHA 116 (e.g., referring to FIG. 1) in both its lateral deflection in both inclination and pseudo-azimuth planes in a curved borehole 116 (e.g., referring to FIG. 1). FIG. 9 illustrates neural network (NN) 900. NN 900 may operate utilizing one or more information handling systems 120 (e.g., referring to FIG. 1) on computing network 800. Although a NN is illustrated, multiple models may be used with input output structures. These models may include flexible empirical models such as NN, gaussian processing methods, kriging methods, evolutionary methods such as genetic algorithms, classification methods, clustering methods empirical methods, or physics based methods such as equations of state, thermodynamic models, geological, geochemistry, or chemistry models, or kinetic models or any combinations therein including recursive combinations of similar or dissimilar models and iterative model combinations. A NN 900 is an artificial neural network with one or more hidden layers 902 between input layer 904 and output layer 906. In examples, NN 900 may be software on a single information handling system 120. In other examples, NN 900 may software running on multiple information handling systems 120 connected wirelessly and/or by a hard-wired connection in a network of multiple information handling systems 120. Herein, NN 900 may be applied in a wide array of implementations.

During operations, inputs 908 data are given to neurons 912 in input layer 904. Neurons 912, 914, and 916 are defined as individual or multiple information handling systems 120 connected in a computing network 800. The output from neurons 912 may be transferred to one or more neurons 914 within one or more hidden layers 902. Hidden layers 902 includes one or more neurons 914 connected in a network that further process information from neurons 912. The number of hidden layers 902 and neurons 912 in hidden layer 902 may be determined by personnel that designs NN 900. Hidden layers 902 is defined as a set of information handling system 120 assigned to specific processing. Hidden layers 802 spread computation to multiple neurons 912, which may allow for faster computing, processing, training, and learning by NN 900. Output from NN 900 may be computed by neurons 916. An information handling system 120 (e.g., referring to FIG. 1) being utilized in a computing network 800, NN 900, or alone may control measurement operations downhole with pulsed neutron logging tool 132. Specifically, information regarding a neutron to gamma ray timing may be computed and utilized by information handling system 120 during measurement operations in which pulsed neutron generator 308 (e.g., referring to FIG. 3) is pulsed. In a sub-µs time domain, fast neutrons and inelastic gamma rays 320 dominate, whereas in a 10-1000 µs time range, thermal neutrons 328 are bouncing around and capture gamma rays are detected.

Figure 10:
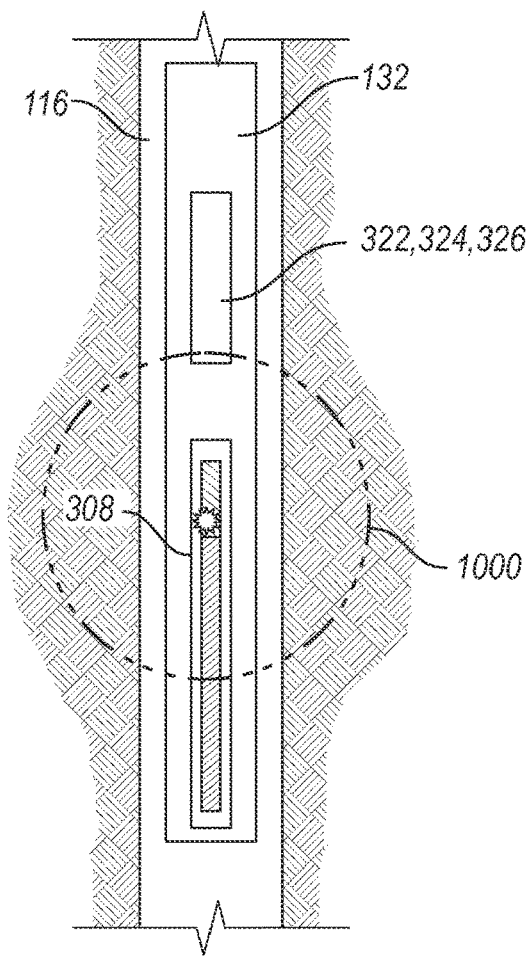
FIG. 10 illustrates a thermal neutron cloud within a wireline operation.

In addition, thermal neutrons 328 may take a long time (up to or more than 1000 µs) to be captured due to low material capture cross-sections and may continuously bounce around. This is illustrated in FIG. 10, which depicts a pulsed neutron logging tool 132 within borehole 116 during a measurement operation. Thermal neutrons 328 are distributed with their population density as a function of distance from the target of pulsed neutron generator 308, and as a function of time, around pulsed neutron logging tool 132, borehole 116, and formation 204. Thermal neutrons 328 may behave as a thermal neutron "cloud" 1000 surrounding pulsed neutron tool 132. Within detection area 304 near thermal neutron detector 330, far thermal neutron detector 332, and long thermal neutron detector 334 may be sensing the interaction of thermal neutrons 328 within thermal neutron cloud 1000 with the nuclei of formation 204. Alternatively, within detection area 304 near scintillator gamma ray detector 322, far scintillator gamma detector 324, long scintillator gamma ray detector 326 may be sensing the inelastic and capture gamma rays from the interactions of fast neutrons 318 and thermal neutrons 328 within the thermal neutron cloud 100 with the nuclei of formation 204. Thus, pulsing schemes allow isolation of inelastic gamma rays 320 (e.g., referring to FIG. 3) and capture gamma rays 320, and/or thermal neutrons 328. Pulsing schemes may further allow for measurements of neutron porosity, and elemental determinations of different nuclei in borehole 116, formation 204, or fluids within formation 204. Methods and systems discussed below may allow for identifying the best pulsing scheme for pulsed neutron logging tool 132 during measurement operations. This may allow for a plurality of measurements to be taken simultaneously during a single logging trip, allow the manipulation of thermal neutron cloud 1000, and the optimization of measurements to acquire high quality required data.

Figure 11:
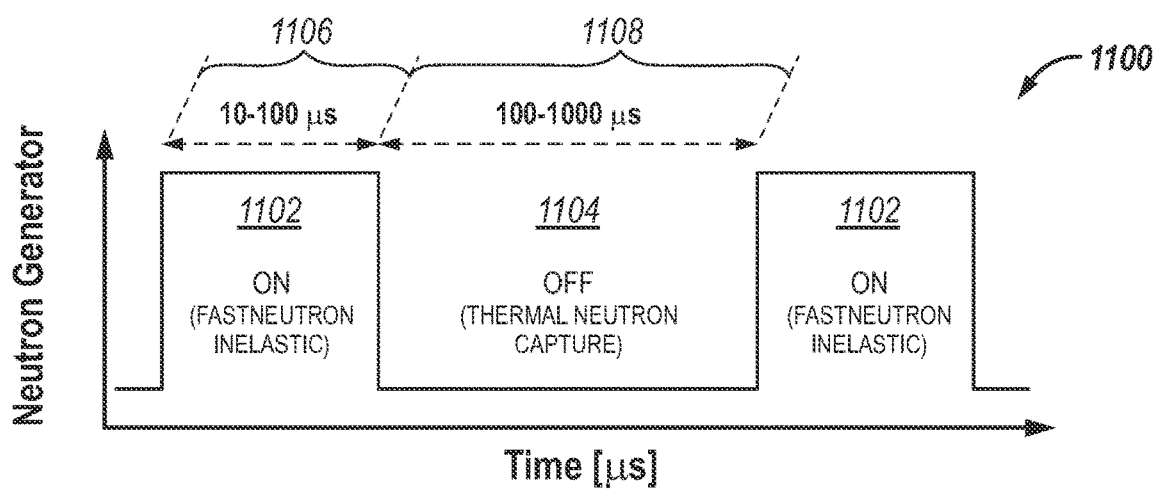
FIG. 11 is a graph showing an on pulsing status and an off pulsing status.

FIG. 11 illustrates a rudimentary pulsing scheme 1100, showing a neutron generator 308 (e.g., referring to FIG. 3) is operated with an ON pulsing state 1102 and an OFF pulsing state 1104 with a given pulse width 1106 and timing interval 1108, for fast neutron inelastic and thermal neutron capture measurements. A minimum pulse width or directly the operating duty factor (percentage of the "ON" time during a pulsing cycle), may be utilized for operating neutron generator 308 to produce a sufficient high flux of fast neutrons 318, to allow not only the fast neutron inelastic gamma ray measurements, but also with enough number of thermal neutrons 328 bouncing around to enable the thermal neutron measurements and capture gamma ray measurements during the "OFF" time.

In wireline applications, as illustrated in FIG. 2, pulsed neutron logging tools 132 have been developed, and many versions of pulsing schemes 1100 have been deployed for various measurements with emphasis on special purposes, potentially through multiple logging trips with alternate pulsing schemes. In LWD applications, as illustrated in FIG. 1, multiple logging trips are not practical. Thus, a universal pulsing scheme, discussed below, may be utilized and optimized for multi-purpose measurements and for acquiring high quality required data, not only for boosting the wireline logging efficiency but also for enabling the LWD applications.

Figure 12:
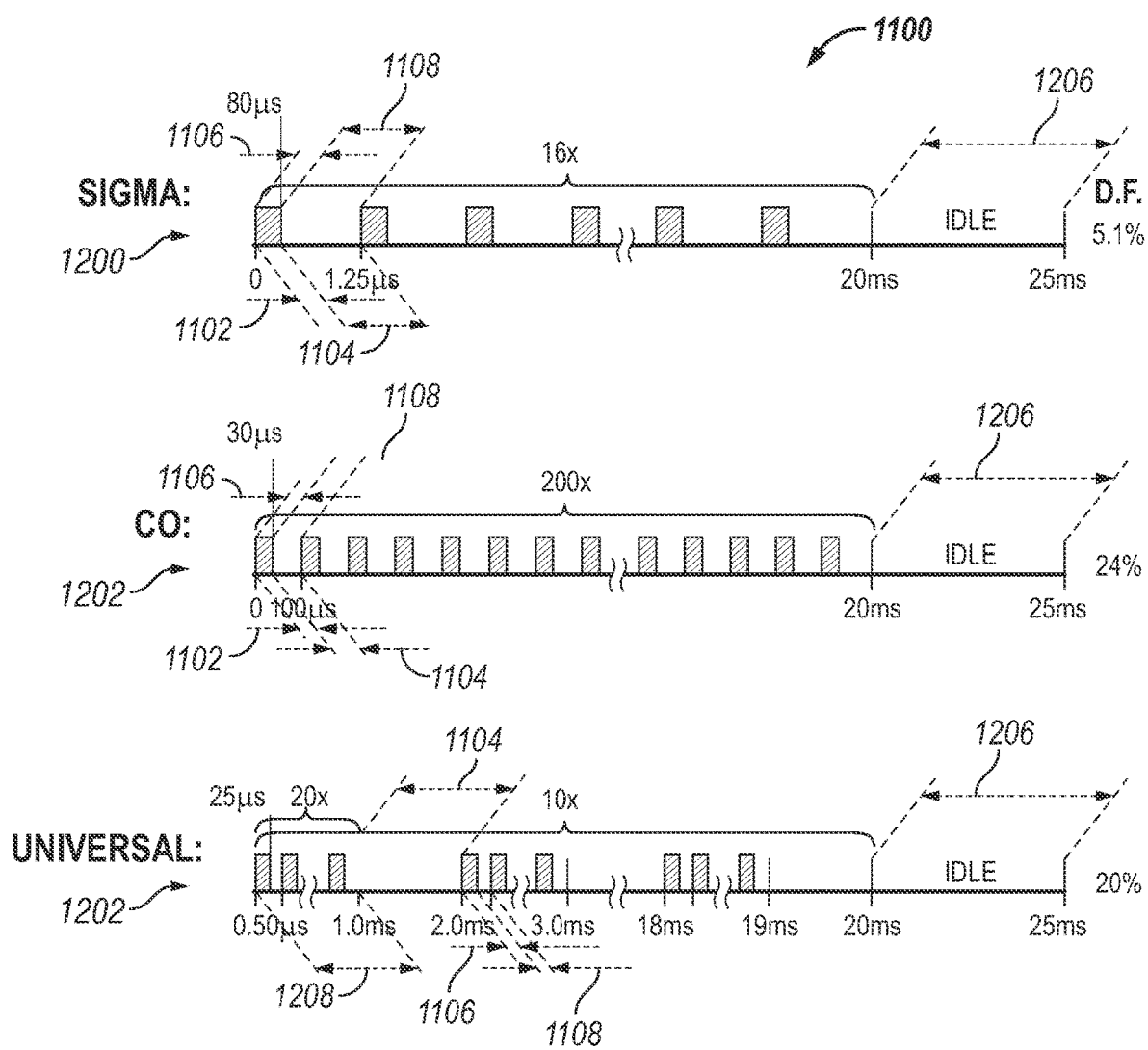
FIG. 12 illustrates graphs of a Sigma pulsing scheme, a CO pulsing scheme, and a Universal pulsing scheme at 25 ms total time cycle.

FIG. 12 illustrates examples of various pulsing schemes 1100 that may be utilized during measurement operations in a LWD or wireline measurement operation. As illustrated, a Sigma pulsing scheme 1200 and a CO pulsing scheme 1202 may be utilized for facilitating different neutron logging measurements within a 25 ms total time cycle, to be compared with an example of disclosed universal pulsing scheme 1204.

Sigma pulsing scheme 1200 shows the neutron generator 308 (e.g., referring to FIG. 3) has an ON pulsing state 1102 for 80 µs and an OFF pulsing state 1104 for 1170 µs for a cycle of 1250 µs. This ON/OFF cycle is repeated sixteen times for a total 20 ms, before a 5 ms idle time 1206. This may be noted as:

$$\{((80\,\mu s + 1170\,\mu s)\,|\,1250\ \mu s) * 16 = 20\text{ ms}\} + 5\text{ ms idle} = 25\text{ ms total} \quad (1)$$

<div align="right">frame width</div>

The 25 ms frame is repeated 40× per second. The Sigma pulsing scheme 1200 uses a single and wide neutron burst with a pulse width 1106 of 80 µs, and a timing interval 1108 of 1170 µs "OFF" time to allow for a long sigma decay and thermal neutron capture spectroscopy measurements, which results the neutron generator operating with a low 5.1% duty factor, including the 5 ms idle time.

CO pulsing scheme 1202, as its name suggests, focuses on fast neutron inelastic and short time window thermal neutron capture spectroscopy measurements with narrow pulse width 1106 of 30 µs neutron pulses and timing intervals 1108 of 80 µs in 100 µs time cycles. Namely, CO pulsing scheme 1202 has an ON pulsing state 1102 for 30 µs and an OFF pulsing state 1104 for 80 µs for a cycle of 100 µs. This ON/OFF cycle is repeated for two-hundred times for a total 20 ms, before a 5 ms idle time 1206. This may be noted as:

$$\{((30\ \mu s + 70\ \mu s) | 100\ \mu s) * 200 = 20\ ms\} + 5\ ms\ idle = 25\ ms\ total \quad (2)$$

frame width

The 25 ms frame is repeated 40× per second. This enables fast neutron spectroscopy, and determination of the carbon-oxygen ratios. The scheme gives a high 30*200/25000=24% duty factor, in general, good for the pulsed neutron generator operation. Both pulsing schemes, to be effective for a plurality of different measurements, must take a plurality of separate logging trips to acquire corresponding data, which is impractical in LWD operations.

With continued reference to FIG. 12, universal pulsing scheme 1204 may enable multiple measurements simultaneously in a single logging trip, by bundling both CO pulsing scheme 1202 and Sigma pulsing scheme 1200 together. Universal pulsing scheme 1204 has multiple level timing cycles, comprising of a CO neutron burst train 1208 with 20 pulses, each with a 25 μs ON pulse width 1106 and an OFF pulsing state of 25 μs cycle for fast neutron inelastic and short time gate thermal neutron capture spectroscopy, then followed by a timing interval 1108 of 1000 μs long sigma decay for thermal neutron sigma and spectroscopy measurements. This CO+Sigma combined cycle is repeated 10 times for a total 20 ms before a 5 ms idle time 1206 to complete the 25 ms cycle, which gives a 25*20*10/25000=20% duty factor for neutron generator 308 (e.g., referring to FIG. 3). The 25 ms frame is repeated 40× per second. Thus, during measurement operations, all selected data measurements may be acquired in one pulsing scheme, with the same fast neutron flux from the same neutron generator 308 operated in a high duty factor condition. This may be noted in shorthand as:

$$\{((((25\ \mu s + 25\ \mu s) | 50\ \mu s) * 20) + 1000\ \mu s) * 10 = 20\ ms\} + 5\ ms\ idle = \quad (3)$$

25 ms total frame width

The 5 ms idle time 1206 in the 25 ms period is intended for background or natural gamma ray measurements of formation 204 (e.g., referring to FIG. 3). Generally, the front 2 ms is reserved for waiting for thermal neutrons 328 to be at least in part captured, while the last 3 ms of the 5 ms idle time is for the natural gamma ray counting. That is, there is a 2 ms overhead, and the 5 ms creates a 20% idle time 1206 for neutron generator 308. This scheme may be altered by switching to a 50 ms cycle.

Figure 13:
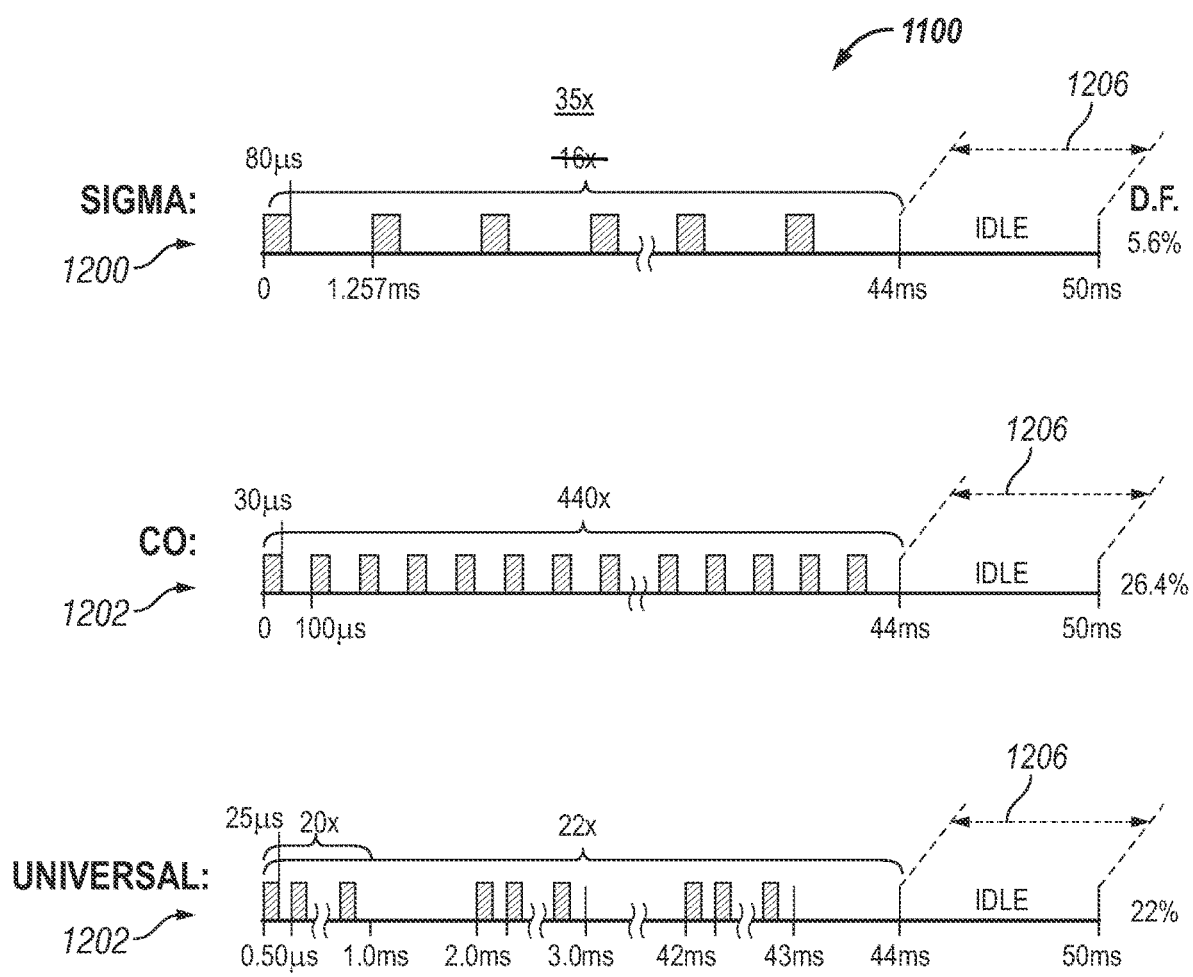
FIG. 13 illustrates graphs of a Sigma pulsing scheme, a CO pulsing scheme, and a Universal pulsing scheme at 50 ms total time cycle.

FIG. 13 shows the revised examples of Sigma pulsing scheme 1200, CO pulsing scheme 1202, and universal pulsing scheme 1204 with a 50 ms total time cycle, instead of 25 ms. The 50 ms frame is repeated 20× per second. Now with a 6 ms idle time 1206 in a 50 ms cycle, the percentage idle time is reduced to 12%. After a 2 ms waiting period for thermal neutrons 328 (e.g., referring to FIG. 3) to "die" down, there is a 4 ms time for natural gamma ray measurements. The pulsing patterns are summarized below as first Sigma:

$$\{((80\ \mu s + 1177\ \mu s) | 1257\ \mu s) * 35 = 44\ ms\} + 6\ ms\ idle = 50\ ms\ total \quad (4)$$

frame width

-continued

CO $$\{((30\ \mu s + 70\ \mu s) | 100\ \mu s) * 440 = 44\ ms\} + 6\ ms\ idle = 50\ ms\ total \quad (5)$$

frame width

Universal $$\{((((25\ \mu s + 25\ \mu s) | 50\ \mu s) * 20) + 1000\ \mu s) * 22 = 44\ ms\} + 6\ ms\ idle = \quad (6)$$

50 ms total frame width

Universal pulsing scheme 1204 may be revised and optimized for specific applications. Discussed below are further methods and systems that utilize universal pulsing scheme 1204. For illustrative purposes only, measurements may use far gamma ray scintillator detector 324 counting rates as a base for illustration, which may be generalized to other scintillator gamma ray detectors 322, 326 or thermal neutron detectors 330, 332, 334. By analyzing what far gamma ray scintillator detector 324 measures, the revision of universal pulsing scheme 1204 may be much more direct and clearer.

As noted above, neutron generator 308 (e.g., referring to FIG. 3) produces neutrons using a "burst-on, burst-off" sequence. During burst-on, neutrons 318 enter formation 204 and produce gamma rays 320 (e.g., referring to FIG. 3) by inelastic scattering and capture reactions. During burst-off, the neutron population and gamma ray intensity decay away by capture reaction. The decay of neutron cloud 1000 (e.g., referring to FIG. 10) population and gamma ray intensity may be analyzed on a time decay curve to show decay of neutron cloud 1000 and gammy ray intensity as a function of time. Reviewing the time decay curve, two regimes may be seen. A first regime with an early time that is dominated by borehole capture and a second regime with a late time that is dominated by formation capture. In late time, the borehole signal may have mostly decayed away leaving a relatively clean formation signal. Thus, a time-gated energy spectrum in the second regime (i.e., late time) may be free of borehole signal, which for this disclosure, is defined as thermal neutron capture gamma ray signals.

Figure 14:
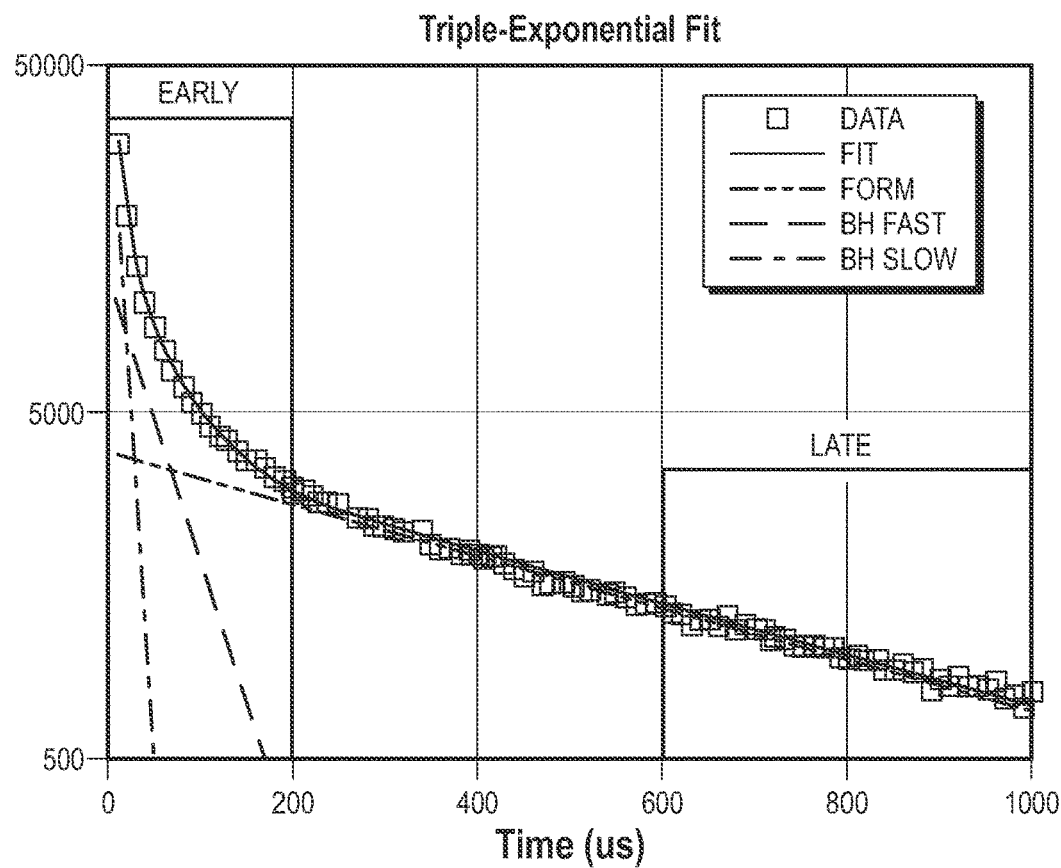
FIG. 14 is a graph of a time decay curve following a neutron burst.

During measurements, a gamma-ray decay signal following a neutron burst may be fit to a dual exponential. In such a fit, one component represents the borehole environment, and one component represents the formation environment. A more general approach is a triple exponential fit whereby one component represents the tool body, one component represents the borehole fluid, and one component represents the formation. FIG. 14 is a graph of a time decay window that plots a time decay spectrum after a neutron burst, for an LWD pulsed neutron logging tool 132 (e.g., referring to FIG. 1) inside a borehole 116 filled with water of a 0 pu quartz formation. The time decay window may have a chosen "width" that runs from 0 to 1000 microseconds. The neutron burst itself ends just before this spectrum starts (i.e. it ends at time 0). The entire time decay window needs to have a width which is large enough to allow the neutron population (as indicated by the capture gamma ray decay curve plotted in FIG. 14) to die away. Generally, the width may range from about 600 microseconds to about 1000 microseconds or more. The total width may encompass the early gate and the late gate (which are two time windows inside the total decay). During each time gate, an energy spectrum may be formed, as will be discussed later. Creating a time spectrum is done by histogramming the recorded time of each count detected by the tool. The time spectrum (e.g. FIG. 14) has a certain bin width (not shown) which might be, for example, 10 microseconds. In examples, the time bins may be 0-10, 10-20, 20-30, 30-40, . . . , and/or all the way to 990-1000 microseconds. If the time associated with a certain count is 23 microseconds, it is put into the 20-30 bin, and if the time is 998, it is put into the 990-1000 bin, and so forth. After thousands and thousands of counts are recorded, the time-gated energy spectrum is plotted as illustrated in FIG. 14. Additionally, within the graph of FIG. 14, the three dashed lines for "Form," "BH fast," and "BH slow" in the graph represent the three components, and the combination of the three components (the solid line) represents an optimal fit to the time decay data. Measurements may be taken within an "early gate" or a "late gate." For this disclosure, a "gate" is defined as a window of time in which energy spectroscopy measurements are taken.

The early gate starts at a time after the neutron burst itself stops and ends a few hundred microseconds later. Thus, the start time of the early gate is zero, and the stop time of the early gate is somewhere in the range 100-400 microseconds after time 0, but preferably 200 microseconds after time 0 as shown in FIG. 14. The width of the early gate should be at least 100 microseconds, to allow some counts to enter, but preferably 200 microseconds to allow a more robust count rate. The late gate starts after the early gate stops, but preferably with a delay between the two gates. Thus, the start time of the late gate is as early as 400 microseconds after time 0, depending on the stop time of the early gate, and as late as 2000 microseconds after time 0, when the decay signal is approaching zero, but preferably around 600 microseconds after time 0, which allows for a 400 microsecond delay between early and late gates. The stop time of the late gate should be as late as possible, at least 200 microseconds after the start of the gate, but preferably 400 microseconds after the start of the gate, so as to allow sufficient counts. This puts the stop time of the late gate as early as 600 microseconds after Ctime 0 but preferably at 1000 microseconds or later.

Figure 15:
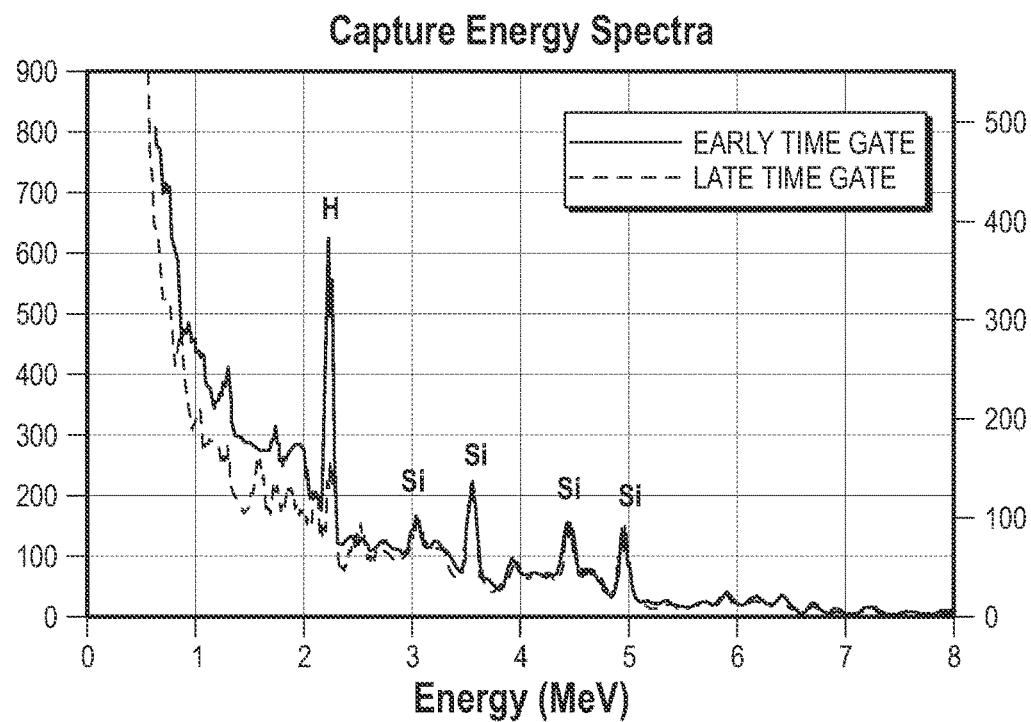
FIG. 15 is a graph of a time-gated capture energy spectra for an "early" and a "late" time gate.

This may be seen in the "late" time gated energy spectrum of FIG. 15, which shows a greatly reduced H borehole peak as compared with the "early" time gated spectrum. The reason for the borehole reduction at late times is that the borehole environment, with its metals and high sigma fluids, is a strong absorber of thermal neutrons. As such, the neutron population there decays early in time. Generally, the late gate may be initiated after a burst train 1208 (e.g., referring to FIG. 12). In examples, the early gate may be initiated following the last neutron burst. A late gate may typically follow the early gate by four or five hundred microseconds and run to the end of the decay window (which may have a total width on the order of 1000 microseconds. For the early gate, spectroscopy measurements may start following the end of the neutron burst and run for several hundred microseconds. It may run for 100 microseconds, 200 microseconds, 300 microseconds, or perhaps even 400 microseconds. For a late gate, the spectroscopy measurements may start at 500 microseconds, 600 microseconds, 700 microseconds or even 800 microseconds. The duration of the late gate may run to the end of the decay window, which might be 1000 microseconds from cessation of the neutron burst, or perhaps 1500 microseconds, or even 2000 microseconds. In other embodiments, a late gate may start at a time that is three times the width of the early gate, the borehole thermal neutrons within thermal neutron "cloud" 1000 may have largely been captured and only the formation thermal neutrons 328 (e.g., referring to FIG. 3) remain. The captured gamma rays may be reflective of a relatively clean formation spectrum. In such the time-gated energy spectrum reflects that only a small borehole influence remains due to neutron diffusion into borehole 116 (e.g., referring to FIG. 3). The time-gated energy spectrum is built up in the same way, but using energy signal and energy bins, which might be, for example, approximately 40 keV in width. The time-gated energy spectra, which are the two spectra in FIG. 15, are built up by only accepting counts which have associated times that fall into a certain time gates. Thus, the solid curve of FIG. 15 is from counts that were recorded during the early time gate, and the dashed curve is from counts recorded during the late time gate. The dashed curve is "better" in the sense that it shows all the formation peaks of interest (e.g. silicon from quartz) but not the borehole peaks which are not of interest (e.g. the H peaks from the water in the borehole).

During measurements in the late time gate, count rate may be reduced by a certain amount, for example, 38% in this case. However, this magnitude of reduction is usually not an issue. Additionally, the "late" gate may be later in time than is typically allowed by a standard "CO" pulsing scheme 1202 (e.g., referring to FIG. 12). This approach may work better when applied to the well-known "Sigma" pulsing schemes 1200 (e.g., referring to FIG. 12) with their characteristic long decay times. As noted above, universal pulsing scheme 1204 (e.g., referring to FIG. 12) comprises a portion of Sigma pulsing scheme 1200 and the late time measurements may be performed after that pulsing scheme.

The methods and systems described above are improvements over current technology in that they remove borehole signals that may contaminate borehole logs. This may reduce the error of the derived elemental yields and elemental weight concentrations of the formation. Specifically, current technology removes the effects of borehole contamination after the spectrum is acquired. The new approach is to use time gating to remove the effects of borehole contamination before the spectrum is acquired, thus removing, or at least ameliorating, the need for complex corrections later on. The preceding description provides various examples of the systems and methods of use disclosed herein which may contain different method steps and alternative combinations of components.

Statement 1: A method may comprise selecting a pulsing scheme for taking one or more measurements using a pulsed neutron logging tool, selecting a neutron burst width for the pulsing scheme based at least in part on a neutron tube utilized by the pulsed neutron logging tool to form at least in part a neutron burst train, selecting a decay window in which the one or more measurements are performed by the pulsed neutron logging tool, and selecting a starting time for a late gate in which the one or measurements are taken. The method may further comprise disposing the pulsed neutron logging tool into a borehole, performing the neutron burst train with the pulsed neutron logging tool, and performing the one or more measurements with the pulsed neutron logging tool during the late gate.

Statement 2: The method of statement 1, wherein a width of the decay window a time between an end of the neutron burst train and a beginning of a second neutron burst train.

Statement 3: The method of any previous statements 1 or 2, further comprising selecting a starting time for an early gate in the decay window that is initiated immediately after the last burst of the neutron burst train.

Statement 4: The method of statement 3, further comprising selecting a width for the early gate.

Statement 5: The method of statement 4, further comprising creating a time-gated energy spectrum from the one or more measurement within the early gate.

Statement 6: The method of statement 5, wherein the early gate has a duration of 200 microseconds.

Statement 7: The method of any previous statements 1, 2, or 3, wherein the starting time for the late gate is after an early gate.

Statement 8: The method of statement 7, wherein the late gate is initiated about 400 microseconds after the early gate ends.

Statement 9: The method of statement 7, further comprising selecting a width for the late gate.

Statement 10: The method of statement 9, further comprising creating a time-gated energy spectrum which is acquired during the late gate.

Statement 11: A system may comprise a pulsed neutron logging tool. The pulsed neutron logging tool may comprise a neutron tube disposed in a pulsed neutron generator, one or more gamma ray scintillator detectors, and one or more thermal neutron detectors. The system may further comprise an information handling system in communication with the pulsed neutron logging tool and configured to select a pulsing scheme for taking one or more measurements using a pulsed neutron logging tool, select a neutron burst width for the pulsing scheme based at least in part on a neutron tube utilized by the pulsed neutron logging tool to form at least in part a neutron burst train, and select a decay window in which the one or more measurements are performed by the pulsed neutron logging tool. The information handling system may further be configured to select a starting time for a late gate in which the one or measurements are taken, select a time for a late time gate that is initiated after the neutron burst train in which one or more measurements may be performed, instruct the neutron tube to emit a neutron burst train, and instruct the one or more gamma ray scintillator detectors or the one or more thermal neutron detectors to perform one or more measurements during the late time gate.

Statement 12: The system of statement 11, wherein a width of the decay window a time between an end of the neutron burst train and a beginning of a second neutron burst train.

Statement 13: The system of any previous statements 11 or 12, wherein the information handling system is further configured to select a start time for an early gate in the decay window that is initiated immediately after the last burst of the neutron burst train.

Statement 14: The system of statement 13, wherein the information handling system is further configured to select a width for the early gate.

Statement 15: The system of statement 14, wherein the information handling system is further configured to create a time-gated energy spectrum from the one or more measurement within the early gate.

Statement 16: The system of statement 15, wherein the early gate has a duration of 200 microseconds.

Statement 17: The system of any previous statements 11, 12, or 13, wherein the start time for the late gate is after an early gate.

Statement 18: The system of statement 17, wherein the late gate is initiated about 400 microseconds after the early gate ends.

Statement 19: The system of statement 17, wherein the information handling system is further configured to select a width for the late gate.

Statement 20: The system of claim 19, wherein the information handling system is further configured to create a time-gated energy spectrum which is acquired during the late gate.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:
1. A method comprising:
selecting a pulsing scheme for taking one or more measurements using a pulsed neutron logging tool;
selecting a neutron burst width for the pulsing scheme based at least in part on a neutron tube utilized by the pulsed neutron logging tool to form at least in part a neutron burst train;

selecting a decay window in which the one or more measurements are performed by the pulsed neutron logging tool;

selecting a starting time for a late gate in which the one or measurements are taken;

disposing the pulsed neutron logging tool into a borehole;

performing the neutron burst train with the pulsed neutron logging tool; and performing the one or more measurements with the pulsed neutron logging tool during the late gate.

2. The method of claim 1, wherein a width of the decay window a time between an end of the neutron burst train and a beginning of a second neutron burst train.

3. The method of claim 1, further comprising selecting a starting time for an early gate in the decay window that is initiated immediately after the last burst of the neutron burst train.

4. The method of claim 3, further comprising selecting a width for the early gate.

5. The method of claim 4, further comprising creating a time-gated energy spectrum from the one or more measurement within the early gate.

6. The method of claim 5, wherein the early gate has a duration of 200 microseconds.

7. The method of claim 1, wherein the starting time for the late gate is after an early gate.

8. The method of claim 7, wherein the late gate is initiated about 400 microseconds after the early gate ends.

9. The method of claim 7, further comprising selecting a width for the late gate.

10. The method of claim 9, further comprising creating a time-gated energy spectrum which is acquired during the late gate.

11. A system comprising:

a pulsed neutron logging tool comprising:
a neutron tube disposed in a pulsed neutron generator;
one or more gamma ray scintillator detectors; and
one or more thermal neutron detectors; and an information handling system in communication with the pulsed neutron logging tool and configured to:

select a pulsing scheme for taking one or more measurements using a pulsed neutron logging tool;

select a neutron burst width for the pulsing scheme based at least in part on a neutron tube utilized by the pulsed neutron logging tool to form at least in part a neutron burst train;

select a decay window in which the one or more measurements are performed by the pulsed neutron logging tool;

select a starting time for a late gate in which the one or measurements are taken;

select a time for a late time gate that is initiated after the neutron burst train in which one or more measurements may be performed;

instruct the neutron tube to emit a neutron burst train; and instruct the one or more gamma ray scintillator detectors or the one or more thermal neutron detectors to perform one or more measurements during the late time gate.

12. The system of claim 11, wherein a width of the decay window a time between an end of the neutron burst train and a beginning of a second neutron burst train.

13. The system of claim 11, wherein the information handling system is further configured to select a start time for an early gate in the decay window that is initiated immediately after the last burst of the neutron burst train.

14. The system of claim 13, wherein the information handling system is further configured to select a width for the early gate.

15. The system of claim 14, wherein the information handling system is further configured to create a time-gated energy spectrum from the one or more measurement within the early gate.

16. The system of claim 15, wherein the early gate has a duration of 200 microseconds.

17. The system of claim 11, wherein the start time for the late gate is after an early gate.

18. The system of claim 17, wherein the late gate is initiated about 400 microseconds after the early gate ends.

19. The system of claim 17, wherein the information handling system is further configured to select a width for the late gate.

20. The system of claim 19, wherein the information handling system is further configured to create a time-gated energy spectrum which is acquired during the late gate.

* * * * *